United States Patent [19]
Cisneros et al.

[11] Patent Number: 5,774,829
[45] Date of Patent: Jun. 30, 1998

[54] NAVIGATION AND POSITIONING SYSTEM AND METHOD USING UNCOORDINATED BEACON SIGNALS IN CONJUNCTION WITH AN ABSOLUTE POSITIONING SYSTEM

[75] Inventors: Joseph S. Cisneros, San Dimas; David C. Kelley, Covina; Michael Kiang, Allso Viejo; Louis A. Greenbaum, Redondo Beach, all of Calif.

[73] Assignee: Pinterra Corporation, Garden Grove, Calif.

[21] Appl. No.: 570,747

[22] Filed: Dec. 12, 1995

[51] Int. Cl.[6] ............................. G01S 5/02; H04B 7/185
[52] U.S. Cl. ...................... 701/213; 342/457; 701/214
[58] Field of Search ........................ 364/449.8, 449.95, 364/449.1, 460, 452; 342/357, 457; 340/995; 701/214, 216, 207, 300, 219

[56] References Cited

U.S. PATENT DOCUMENTS

| | | | |
|---|---|---|---|
| 3,774,215 | 11/1973 | Reed | 343/112 D |
| 4,506,228 | 3/1985 | Kammeyer | 329/107 |
| 5,173,710 | 12/1992 | Kelly et al. | 342/463 |
| 5,280,295 | 1/1994 | Kelly et al. | 342/463 |
| 5,311,195 | 5/1994 | Mathis et. | 342/357 |
| 5,323,163 | 6/1994 | Maki | 342/357 |
| 5,355,526 | 10/1994 | Berninger | 455/161.2 |
| 5,365,450 | 11/1994 | Schuchman et al. | 364/449 |
| 5,406,490 | 4/1995 | Braegas | 364/449 |
| 5,422,813 | 6/1995 | Schuchman et al. | 364/449 |
| 5,499,032 | 3/1996 | Kelly et al. | 342/357 |
| 5,510,801 | 4/1996 | Engelbrecht et al. | 342/457 |
| 5,552,772 | 9/1996 | Janky et al. | 340/573 |

OTHER PUBLICATIONS

"A New Approach to Geometry of Range Difference Location"; R.O. Schmidt; IEEE, vol. AES–8, No. 6, Nov. 1972; pp. 821–835.

"A Novel Procedure for Assessing the Accuracy of Hyperbolic Multilateration Systems"; H.B. Lee; IEEE, Vo. AES–11, No. 1, Jan. 1975; pp. 2–14.

"Accuracy Limitations of Hyperbolic Multilateration Systems"; H.B. Lee; IEEE, Vol. AES–11, No. 1, Jan. 1975; pp. 16–29.

(List continued on next page.)

*Primary Examiner*—Michael Zanelli
*Attorney, Agent, or Firm*—Gary S. Williams; Flehr Hohbach Test Albritton & Herbert LLP

[57] ABSTRACT

A navigation system in which an uncoordinated beacon positioning system (UBS) is used in conjunction with an absolute positioning system (APS) is described herein. The UBS employs a multiplicity of transmitters, at known locations, each of which transmits a beacon signal having a phase that is at least partially un-synchronized with the phases of the beacon signals of the other transmitters. Within a mobile unit, separate receivers are provided for receiving these beacon signals and for receiving APS signals. The absolute positioning system (APS) receiver is disposed to receive the APS signals, and to estimate an initial position of the mobile unit therefrom. The mobile unit processor is disposed to modify the estimated mobile unit position on the basis of the detected beacon signal phases. The mobile unit processor may also be programmed to determine the uncertainty of location information provided by the beacon signal receiver and by the APS receiver. This allows the current location of the mobile unit to be updated by selecting the location estimate having associated therewith the least amount of location uncertainty, or by weighting each estimate based on its uncertainty and combining the two weighted location estimates. In another implementation, the mobile unit includes an estimator operative to compute an estimate of mobile unit position on the basis of selected pseudorange measurements from the UBS and APS receivers. The estimator may include a Kalman filter configured to process residual pseudorange information provided by the UBS and APS receivers.

36 Claims, 16 Drawing Sheets

OTHER PUBLICATIONS

"The Theory of Loran–C Ground Wave Propagation—A Review"; S.N. Samaddar; Navigation, vol. 26, No. 3, Fall, 1979; pp. 173–187.

"Omega Possibilities: Limitations, Options, and Opportunities"; E.R. Swanson; Navigation, vol. 26, No. 3, Fall 1979; pp. 188–202.

"Sensitivity of GPS Acquisition to Initial Data Uncertainties"; C.A. Smith et al.; Inst. of Navigation, Papers Published in Navigation, vol. 1, copyright 1980; pp. 31–43.

"Operational Benefits and Design Approaches for Combining JTIDS and GPS Navigation"; Walter R. Fried; Inst. of Navigation, Papers Published in Navigation, vol. ,; Jan. 1984; pp. 209–225.

"The Impact of Cross–Rate Interference on LORAN–C Receivers"; M.J. Zeltser et al.; IEEE vol. AES–21, No. 7, Jan. 1985; pp. 36–46.

"An Algebraic Solution of the GPS Equations"; Stephen Bancroft; IEEE, vol. AES–21, No. 7, Jan. 1985; pp. 56–59.

"Navigational Coordinate Systems: How To Get Your Surface and Air Positioning Very Precise and Still Be Off By 20 Nautical Miles"; Stephen B. Richter et al.; IEEE 1986; pp. 268–272.

"Combining LORAN and GPS—The Best of Both Worlds"; Paul Raisted et al.; Inst. of Navigation, Papers Published in Navigation, vol. III; copyright 1986; pp. 235–240.

"Terrestrial Evaluation of the GPS Standard Positioning Service"; Francis W. Mooney; Inst. of Navigation, Papers Published in Navigation, vol. III,; copyright 1986; pp. 275–293.

"Telenav: A Precision Navigation System Based Upon Television Signal Reception"; Will Connelly; Navigation, vol. 33, No. 2, Summer 1986; pp. 109–122.

"A Direct Solution to GPS–Type Navigation Equations"; Lloyd O. Krause; IEEE vol. AES–23, No. 2; Mar. 1987; pp. 225–232.

"Passive Source Localization Employing Intersecting Spherical Surfaces from Time–of–Arrival Differences"; H.C. Schau et al.; IEEE vol. ASSP35, No. 8, Aug. 1987; pp. 1223–1225.

"Aircraft Experiences with a Hybrid Loran–GPS"; Ralph Eschenbach et al.; Navigation, vol. 35, No. 4; Winter 1988–89; pp. 459–468.

"Aiding GPS with Calibrated Loran–C"; Per K. Enge et al.; Navigation, vol. 35, No. 4; Winter 1988–89; pp. 469–482.

"Cost Effective, High–Accuracy Inertial Navigation"; A Matthews et al.; Navigation, vol. 36, No. 2; Summer 1989; pp. 157–172.

"A Divide and Conquer Approach to Least–Squares Estimation"; IEEE Transactions Aerospace & Electronic Syst., vol. 26, No. 2; Mar. 1990; pp. 423–426.

"Synergistic Integration of GPS and INS for Civil Aviation"; John Diesel et al.; GPS World; May 1991; pp. 41–45.

"A Rate Integrating Fiber Optic Gyro"; Navigation, vol. 38, No. 4; Winter 1991–92; pp. 341–353.

"Urban Positioning with GPS: A Mobile Communications Field Measurement Application"; Jean–Claude Fantou; GPS World; Jul. 1993; pp. 28–39.

"Integration of GPS with Inertial Navigation Systems"; D.B. Cox, Jr.; Inst. of Navigation, Papers Published in Navigation, vol. III, copyright 1986; pp. 144–153.

"Integration of GPS and Dead–Reckoning Navigation Systems"; Wei–Wen Kao; pp. 1–9. No Date.

NAVIGATION AND POSITIONING SYSTEM AND METHOD USING UNCOORDINATED BEACON SIGNALS IN CONJUNCTION WITH AN ABSOLUTE POSITIONING SYSTEM

The present invention relates generally to navigation and positioning systems in which an object or user at an unknown location receives broadcast signals from several sources and uses information derived therefrom to determine the object's or user's current position. More particularly, the present invention relates to a positioning system which uses uncoordinated beacon signals from commercial radio broadcasts in conjunction with synchronized signals from an absolute positioning system to enable a highly accurate position determination.

BACKGROUND OF THE INVENTION

Most of the well known prior art radio frequency (RF) navigation and positioning system, such as LORAN, GLONASS, TRANSIT, and GPS use special transmitters, either orbiting the earth or land-based, dedicated solely to the positioning system. Great efforts are made in such systems to synchronize the transmitters in these systems so that the timing of the signals reaching a user at any location on the earth's surface can be calculated with a known level of accuracy. These types of prior art systems generally require huge capital investments, often government subsidized, because the transmitters and their control systems are very complex and expensive.

The performance of existing RF navigation systems, such as GPS and LORAN, can be significantly compromised in terrestrial environments due when local obstructions (e.g., large buildings) disrupt signal reception. These so-called "urban canyon" difficulties associated with using GPS, LORAN and other absolute positioning systems within metropolitan environments have been described elsewhere. See, for example, the paper by W. Kao, *Integration of GPS and Dead Reckoning Navigation Systems*; Proceedings of the 1991 Vehicle Navigation and Information Conference (VINS 1991). See also the article by J. Fantou, *Urban Positioning with GPS: A mobile communications field measurement application*; GPS World; Vol. 4, No. 7 (July 1993).

In an attempt to overcome these difficulties, hybrid systems have been developed which incorporate both an RF-based, absolute positioning system (e.g., GPS) and a relative positioning system. The relative, or "dead-reckoning", positioning system may be comprised of an inertial sensor unit which includes, for example, a rate gyro, one or more multiple axis accelerometers, an odometer, and an inclinometer. Unfortunately, inertial units of this type tend to become less accurate with extended use. Moreover, such inertial units are subject to disorientation upon experiencing arbitrary rotation of the type which frequently occurs during normal handling of portable units. The dead-reckoning system may further include a database of local streets, which serves to constrain the positional estimate to navigable thoroughfares. By monitoring the outputs of the devices within the inertial sensor unit, the system processor functions in a "dead-reckoning" mode to produce estimates of position and velocity. An exemplary hybrid navigation system of this type is described in, for example, U.S. Pat. No. 5,311,195, entitled Combined Relative and Absolute Positioning Method and Apparatus, issued May 10, 1994.

During operation, the dead-reckoning system produces a short term estimate of position, while the GPS or other RF-based system intermittently "resets" the current position estimate in order to eliminate the positional bias internally accumulated by all dead-reckoning systems. The interval between successive resets of position depends upon the capability of the RF-based system to accurately "fix" the position of the mobile unit, and may vary from a number of seconds to tens of minutes. As the period between each such position fix becomes longer, as often occurs upon entering dense metropolitan areas, the mean accuracy of the position estimate produced by the dead reckoning system is correspondingly degraded.

In one aspect of the present invention, an RF-based positioning system is combined with a positioning system reliant upon the 19 KHz pilot signals transmitted by commercial broadcast stereo FM stations. Unlike GPS signals and other RF positioning signals of relatively high carrier frequency, FM pilot signals are generally not significantly impeded by the nearby presence of building or other large obstructions. This makes such FM pilot signals ideal candidates for use in navigation within urban environments, in which the performance of conventional RF-based systems tends to be degraded. In the United States, there are nearly 5000 Commercial Broadcast FM radio stations configured to broadcast in Stereo, and the FCC requires all stations so configured to broadcast a 19 KHz pilot sub-carrier signal. The maximum allowed deviation is ±2 hertz. Generally the rate of frequency drift has been found to be much less than 0.1 hertz per day. In any case, the transmitters used by the present invention are free, which makes the positioning system of the present invention relatively inexpensive to implement.

Two U.S. patents which describe "delta-position" systems using commercial radio broadcast transmissions are U.S. Pat. Nos. 4,054,880 (Dalabakis et al.) and 3,889,264 (Fletcher). These prior art patents describe systems using three spaced-apart radio signals, each of which is an independent AM radio signal. The systems typically have a vehicle carried mobile receiver, with a separate tuner for each station, and a second receiver at a fixed, known position. Basically, these systems count "zero crossings" of timing signals, each of which indicates that the user has moved a certain distance from his previous location. Thus, if the user needs to know his current position, the user needs to first specify his starting position. A fixed position receiver detects frequency drift of the transmitters, and that drift information is used to adjust and coordinate the zero crossing counts made by the mobile receivers.

These are "delta-position" systems because they determine only the distance and direction traveled by a mobile user from any particular starting point. Neither Dalabakis nor Fletcher actually determines the position of the mobile user, and in fact such a determination is not possible using the Dalabakis or Fletcher systems because these systems do not have the ability to determine the phases of the transmitted radio signals. Furthermore, since only zero crossings are counted, the positioning accomplished by these systems have "granularity", which in the case of the systems disclosed in these two patents is on the order of thirty meters.

Like Dalabakis and Fletcher, the present invention uses spaced apart, commercial radio signals. The present invention may also use a fixed position receiver to help the mobile units determine their position. However, the present invention, unlike Dalabakis and Fletcher, determines the user's position without need for any starting point information, and determines such positions with a high degree of accuracy. To do this, the fixed position receiver not only determines frequency drift, it also determines the relative phases of the various beacons with a very high degree of accuracy (e.g., within about 0.02 degrees, or equivalently, within about 0.00035 radians) using a digital phase-locked loop. Using this relative phase information, the commercial radio signal beacons are transformed, in essence, into coordinated beacon signals with well defined phase relationships. As a result, the position of the mobile users can be computed from the radio signals received by the mobile user with an accuracy of about ±10 meters in the general case, and with appreciably greater accuracy in the absence of multipath.

SUMMARY OF THE INVENTION

In summary, the present invention is a navigation system in which an uncoordinated beacon positioning system (UBS) is used in conjunction with an absolute positioning system (APS). The uncoordinated beacon positioning system employs a multiplicity of transmitters, at known or otherwise discernible locations, at least some of which transmit a beacon signal of approximately the same frequency or repetition rate. The phases of the beacon signals are at least partially un-synchronized with the phases of the beacon signals of the other transmitters.

Within each mobile unit, separate receivers are provided for receiving these beacon signals and for receiving APS signals. At least three of the beacon signals are received by the UBS receiver, which includes phase detection circuitry for detecting beacon signal phase. The absolute positioning system (APS) receiver is disposed to receive the APS signals, and to estimate an initial position of the mobile unit therefrom. In a preferred embodiment, a mobile unit processor computes a current location of the mobile unit based on: (i) the detected phases of at least three of said beacon signals, and (ii) the estimate of mobile unit initial position.

In another aspect of the invention, the mobile unit processor is programmed to determine the uncertainty of location information provided by the UBS and APS receivers. In this embodiment the current location of the mobile unit may be updated by selecting the location estimate having associated therewith the least amount of location uncertainty. Alternately, each location estimate may be weighted based on its uncertainty, and the two weighted location estimates combined to yield a composite estimate.

In yet another embodiment of the present invention, certain correction information is exchanged between the UBS and APS receivers as a means of improving position estimation accuracy. In this embodiment the mobile unit includes an estimator operative to compute an estimate of mobile unit position on the basis of selected pseudorange measurements from the UBS and APS receivers. In a particular implementation, the estimator includes a Kalman filter configured to process residual pseudorange information provided by the UBS and APS receivers.

The beacon signal transmitters may comprise, for example, a multiplicity of commercial radio signal transmitters, at known fixed locations, each of which transmits a beacon signal having a phase that is unsynchronized with the phases of the beacon signals of the other transmitters. All of the beacon signals have a frequency which is approximately equal to a predetermined target frequency. In the preferred embodiment, the beacon signals are 19 KHz pilot tones generated by Commercial Broadcast stereo FM stations.

The uncoordinated beacon positioning system may also include a first receiver, known as the fixed position observer, positioned at a known location. The fixed observer receives the beacon signals, determines the relative phases of the beacon signals, and broadcasts data representing these relative phases. The uncoordinated beacon signal receivers within each mobile unit recover these broadcast values, and receive beacon signals from at least three radio transmitters as described above.

In embodiments including a fixed position observer, each uncoordinated beacon signal receiver computes the location of the mobile unit in which it is disposed based on (A) the relative phase and frequency data broadcast by the fixed position observer, (B) the detected beacon signal phases, and (C) the known positions of the beacon signal transmitters and the fixed observer. In other embodiments, the phase information generated by each uncoordinated beacon signal receiver could be transmitted to a computer at a remote location, so that the position computations for many mobile units could be performed at a central data processing station. The position computations may occur in a timely manner, or they may be deferred and stored.

Even though the uncoordinated beacon positioning system determines the mobile receiver's absolute position with respect to a defined coordinate system, this uncoordinated system does not require synchronization of clocks or time values between the mobile receivers and the fixed observer or any other time base. Rather, time is treated by the mobile receiver as an independent variable, much like the mobile unit's spatial coordinates (e.g., x, y, and z). Using the method of the present invention, relative time offsets between the fixed observer and the mobile receiver, as well as the mobile receiver's absolute position, are determined and maintained by the mobile receiver at a high level of accuracy.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

In accordance with the present invention, determination of the position of mobile units is effected using the uncoordinated beacon signal transmissions from existing commercial FM radio stations, in conjunction with the synchronized navigation signals provided by an absolute positioning system (APS). Although the preferred embodiments described herein are discussed with reference to an APS comprised of the Global Positioning System (GPS), other absolute positioning systems may also may be employed without deviating from the scope of the invention. Included among such absolute positioning systems are, for example, are LORAN C, TRANSIT, OMEGA, and "sign post proximity systems" of the type currently employed in certain European countries. Similarly, the preferred embodiments are discussed herein with reference to an uncoordinated beacon system in which the unsynchronized FM pilot signals broadcast by commercial FM radio stations comprise the beacon signal transmissions. However, the teachings of the present invention are equally applicable to systems in which a plurality of partially synchronized signals are transmitted from known locations.

Included among such partially synchronized signals are:
(i) television (TV) signals, particularly those TV signals which are often controlled using an external time reference (e.g., the 3.58 MHz color burst and 60 Hz retrace signals);
(ii) cellular telephone system signals, particularly the 10 kbps control signals and SAT tones of approximately 6000 Hz utilized within the AMPS system, as well as partially synchronized tone and modulation signals utilized in code-division multiple access (CDMA) and time-division multiple access (TDMA) cellular systems;
(iii) Commercial Broadcast FM radio signals, such as the 57 kHz RBDS modulation signal and related subcarrier signals; and
(iv) Commercial AM radio signals, particularly the AM carrier signal itself.

Figure 1:
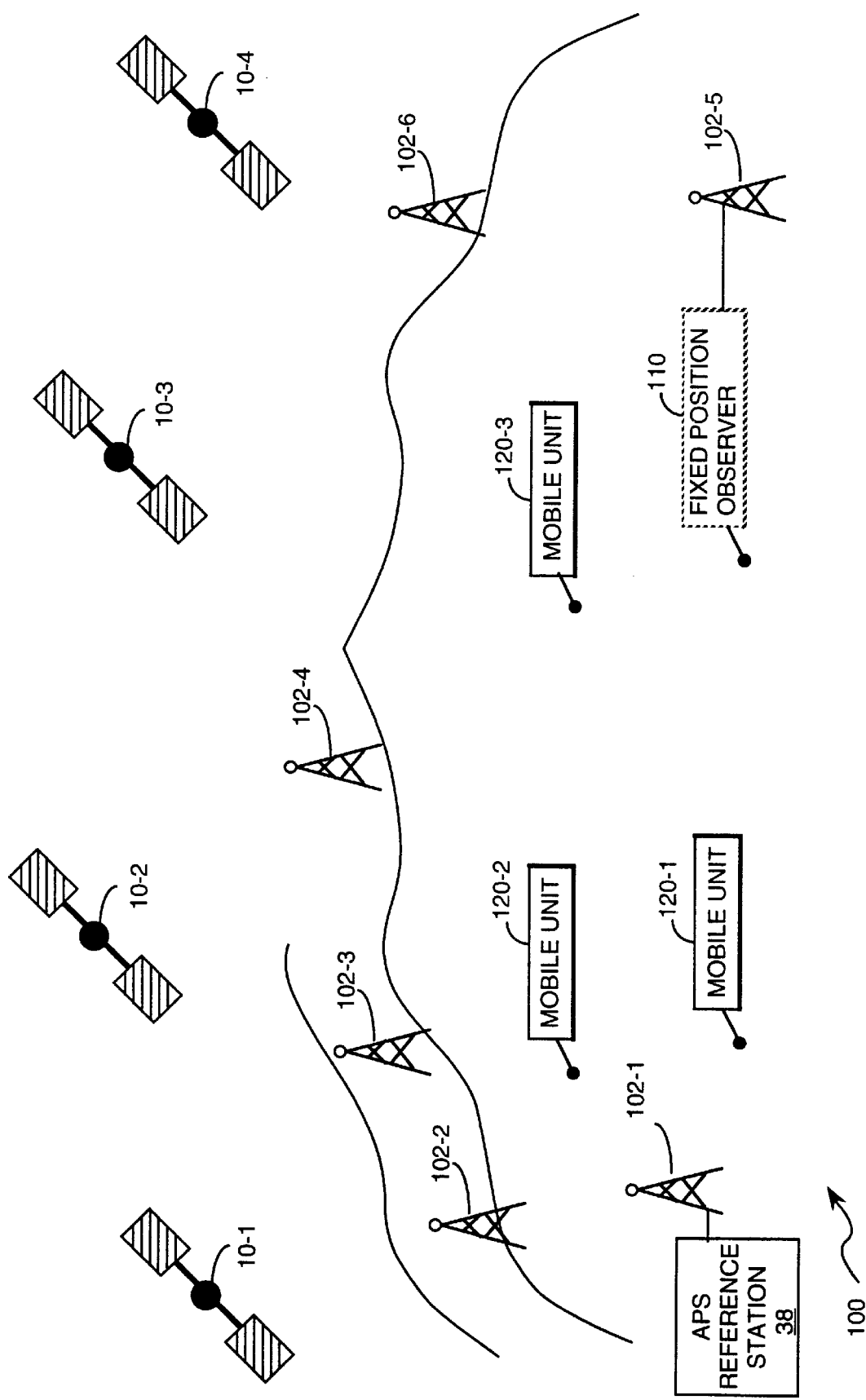
FIG. 1 schematically depicts a positioning system in accordance with the present invention.

Referring to FIG. 1, there are depicted a plurality of GPS satellites 10, each of which broadcasts a unique positioning signal. Under certain conditions, the GPS signals from the satellites 10 may be used for determining the position of a mobile unit on or near the earth. The orbits of the GPS satellites are arranged in multiple planes, in order to maximize the likelihood that signals can be received from at least four GPS satellites at any arbitrary point on or near the earth. It is known, however, that the capability of the GPS system to provide accurate position information tends to be compromised when the mobile unit is located in areas from which the GPS signals from the requisite number of satellites are incapable of being received. This situation arises, for example, within dense metropolitan areas in which buildings and other obstructions may block or otherwise interfere with the mobile unit's reception of the GPS satellite signals.

The orbits of the GPS satellites 10 are determined with accuracy from fixed ground stations and are relayed back to the spacecraft. In navigation applications of GPS, the latitude, longitude, and altitude of any point close to the earth can be calculated from the times of propagation of the electromagnetic signals from four or more of the GPS spacecraft 10 to the unknown location. A measured range, or "pseudorange", between the GPS receiver at the unknown location and the four satellites within view is determined based on these propagation times. The measured range is referred to as pseudorange because there is generally a time difference or offset between timing clocks on the satellites and a timing clock within the GPS receiver. Thus, for three-dimensional position determination at least four satellite signals are typically needed to solve for four unknowns, i.e., the time-offset together with the three-dimensional position.

Referring to FIG. 1, the uncoordinated beacon positioning system uses 19 kilohertz (KHz) pilot signals transmitted by existing commercial FM radio stations 102. Every commercial broadcast stereo FM station in the U.S. has a pilot signal herein called a beacon, that runs at a rate of 19 kilohertz, plus or minus a frequency deviation of no more than two Hertz. There is no coordination of the phases of these signals between stations. FM radio station towers tend to be spaced around the periphery of major metropolitan areas, creating a set of transmitted beacons suitable for dense metropolitan use. This provides an attractive complement to GPS navigation, since as mentioned above, the reception of GPS signals tends to be hindered within urban areas.

The uncoordinated beacon positioning system optionally includes a fixed position observer 110 at a known position, which sequentially scans the FM radio band and receives all the FM station pilot signals in the vicinity. Since its position is known, it can determine the relative phases of all the pilot signals, in terms of their phases at the point of broadcast. It also computes the frequency drift of each station, which is the difference between the station's pilot signal frequency and its nominal frequency, 19 KHz. Periodically (e.g., once every 0.5 seconds) it broadcasts reference data representing the relative phases and drift rate values of all the FM pilot signals in its vicinity.

In one embodiment, the fixed observer broadcasts model coefficients which are used by the receiving mobile unit in a shared predictive model of each beacon's drift. The use of these model coefficients reduces the rate at which reference data values need to be transmitted while still maintaining a high level of accuracy. This is particularly useful in applications in which the data link between the fixed observer and the mobile unit may be subject to periodic dropouts or is capacity constrained.

In most of the world, the base band of each commercial broadcast stereo FM station has a first frequency region in which the station's main program is transmitted, and a subsidiary frequency region, called the Subsidiary Communication Authorization (SCA) channel in which additional programming can be transmitted. In the preferred embodiment, the fixed position observer 110 broadcasts reference data using the SCA channel of at least one FM station, and for greater reliability the SCA channels of at least two FM stations in each region that the uncoordinated beacon system is to be used. Alternately, the fixed position observer 110 could have its own radio transmitter for broadcasting reference data, or it could use any other available communication mechanism.

The uncoordinated beacon system can support an unlimited number of mobile units 120 without increasing the amount of reference data required to be transmitted from the fixed observer unit 110. Each mobile unit 120 receives the broadcast reference data, as well as pilot signals from at least three (and preferably four or more) stations. By using the broadcast reference data to mathematically adjust the received FM pilot signals, the FM pilot signals are, in effect, coordinated. As a result, each mobile unit can compute its position and time.

As is described below, in an alternate embodiment the model coefficients characterizing beacon drift are derived from phase measurements of the pilot signals made individually by each mobile unit 120. This is effected by equipping each mobile unit 120 with a GPS receiver, which allows determination of the mobile unit's position at the time the phase measurements are performed. The process of phase measurement involves sequentially scanning the FM radio band and receiving all the FM station pilot signals in the vicinity. Since the mobile unit's position is known, it can determine the relative phases of all the pilot signals, in terms of their phases at the point of broadcast. The knowledge of mobile unit position provided by the GPS receiver at the time of each such phase measurement allows any observed change in phase of a pilot signal to be made independent of the change in radial distance between the mobile unit and FM station from which the pilot signal was transmitted. This facilitates computation within the mobile unit of the frequency drift of each station, which is the difference between the station's pilot signal frequency and its nominal frequency, 19 KHz. This embodiment is well-suited for navigation within dense metropolitan areas, in which GPS position information may be only intermittently available. During navigation in such areas the position determination process will primarily be performed by the uncoordinated beacon system, with the intermittent updates of exact position provided by the GPS system being used in the computation of beacon phase and drift.

Figure 2A:
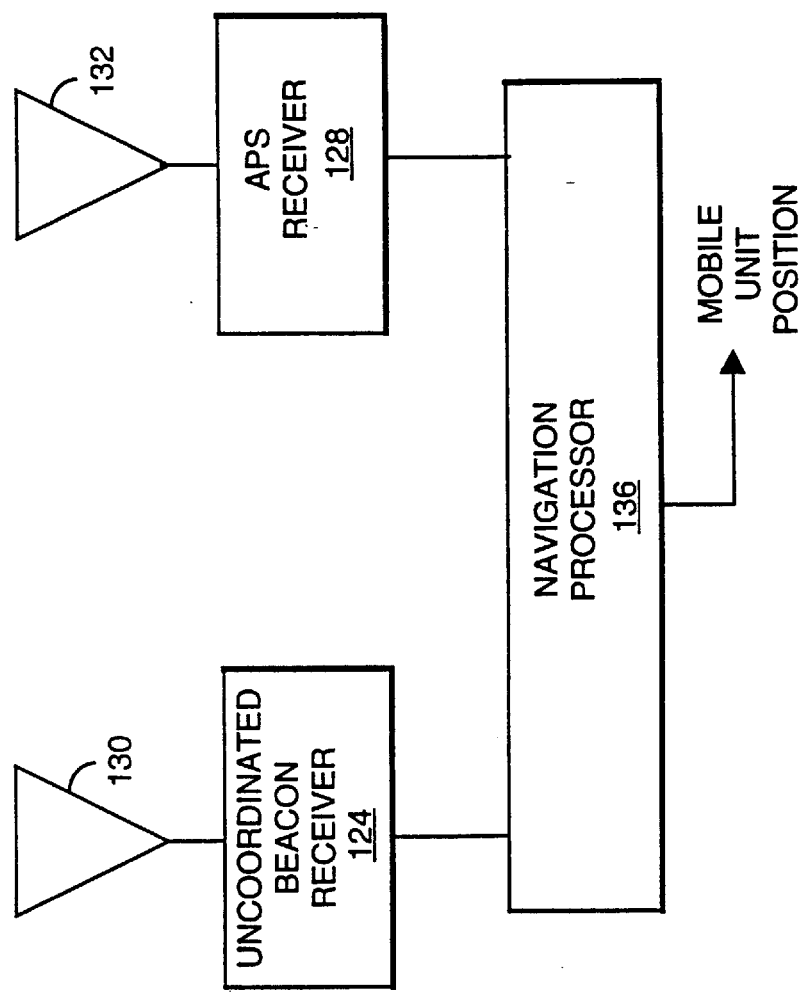
FIG. 2A is a block diagram of a mobile unit which includes an uncoordinated beacon receiver and an absolute positioning system receiver.

Referring to FIG. 2A, the mobile unit 120 includes an uncoordinated beacon receiver 124 and an absolute positioning system (APS) receiver 128. The uncoordinated beacon receiver 124 receives the signal transmissions broadcast by the commercial FM radio stations 102 through an FM antenna 130. The structure and operation of the receiver 124 is described in further detail with reference to FIG. 2B, and is also disclosed in U.S. Pat. No. 5,173,710, which is assigned to the assignee of the present invention and which is herein incorporated by reference. The APS receiver 128 comprises a conventional LORAN C or GPS receiver. As is indicated by FIG. 2A, the APS receiver 128 is linked to ground-based transmitters (i.e., LORAN C), or to the space-based GPS satellites 10 through an APS antenna 132.

As is described hereinafter, positional and other information produced by the APS receiver 128 and the uncoordinated beacon receiver 124 are provided to a navigation processor 136 for use in determination of position of the mobile unit. It has already been mentioned that periodic reports of absolute position provided by the APS receiver 128 may obviate the need for a "fixed observer" within the uncoordinated beacon system. That is, the navigation processor 136 could be programmed to compute the model coefficients characterizing beacon drift by using: (i) the beacon signal phase measurements from the beacon receiver 124, and (ii) the information from the APS receiver 128 identifying the mobile unit's position at the time of the phase measurements. A more thorough explanation of this method of reference data computation and mobile unit position determination is provided below within the section entitled MAIN CONTROL ROUTINE—MOBILE UNIT. In addition, several other techniques for mobile unit position determination using the complementary information provided by the uncoordinated beacon system and the absolute positioning system are described later in the section entitled DUAL SYSTEM POSITION DETERMINATION.

It is emphasized that the present invention contemplates not only techniques for enabling an absolute positioning system to "aid" the operation of an uncoordinated beacon system, but also prescribes reciprocal methods in which the operation of an absolute positioning system is assisted using the uncoordinated beacon system. As an introductory example, consider the APS reference station 38 shown in FIG. 1. In a preferred embodiment the APS reference station comprises a GPS reference station located at a precisely known position, which functions to compute GPS "corrections" for use by other GPS receivers in the vicinity. These corrections are known to be broadcast using the Subsidiary Communication Authorization (SCA) channel of the FM station 102-1, as well as by a variety of government agencies (e.g., the U.S. Coast Guard). These corrections are received by the uncoordinated beacon receivers 124 within each mobile 120, and are provided to the APS receivers 128 therein (when realized as GPS receivers) in order to ensure the accuracy of the absolute position information produced thereby.

Figure 2B:
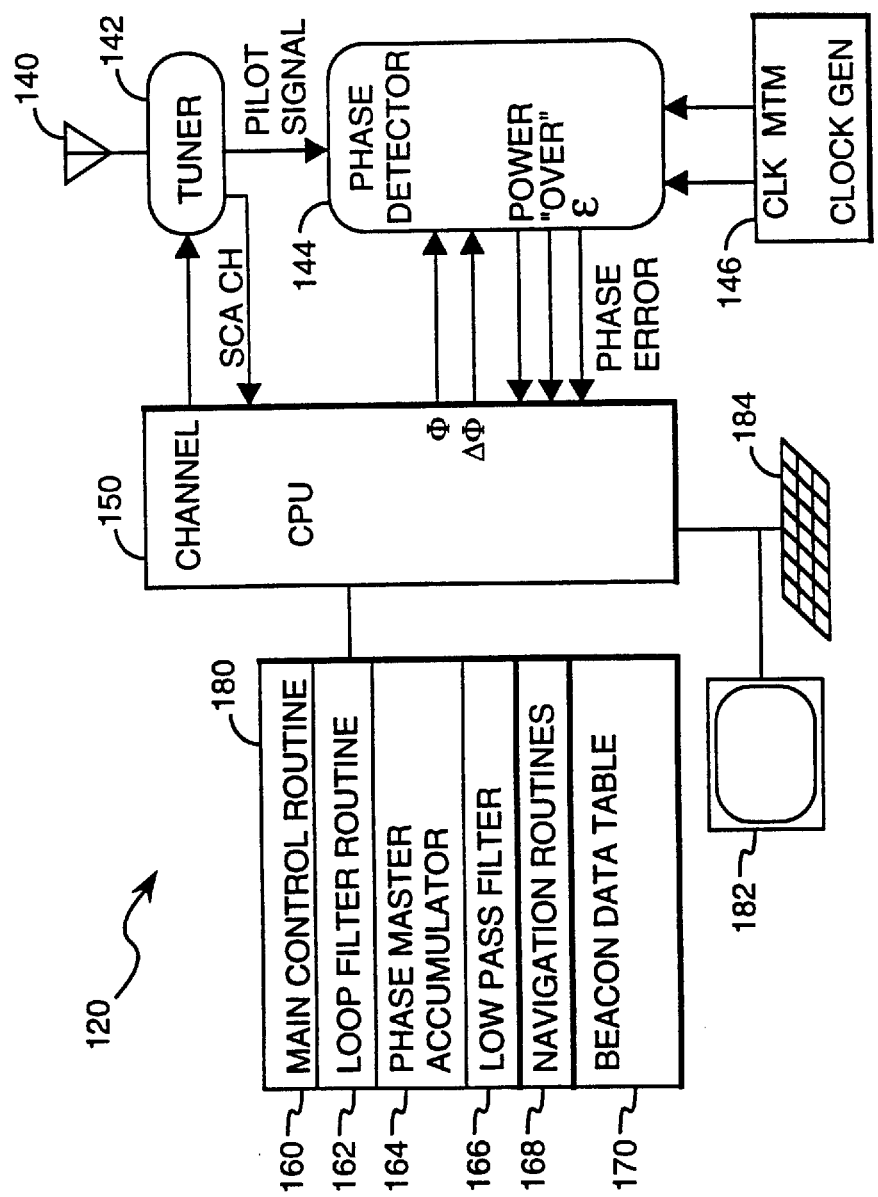
FIG. 2B is a more detailed block diagram of the uncoordinated beacon receiver within the mobile unit.

Turning now to FIG. 2B, the uncoordinated beacon receiver 124 within each mobile unit 120 has an antenna 140 and a tuner 142 for receiving selected FM radio station signals and extracting its 19 KHz pilot signal from the baseband signal. A digital phase detector (PD) circuit 144 receives this baseband pilot signal. It also receives clock signals from a clock generator 146, as well as a starting phase value $\Phi$ and a "delta phase" value $\Delta\Phi$ from the unit's central processing unit (CPU) 150. These clock, phase and delta phase values are used by the PD 144 to generate a reference signal. The PD 144 compares the received baseband pilot signal with the reference signal and generates corresponding phase error information.

In the preferred embodiment, the phase measurement circuitry is implemented with a digital phase-locked loop (DPLL), which includes the PD 144 working in conjunction with a loop filter implemented in software (i.e., running on CPU 150).

Tuner 142 is also used to receive broadcast reference data from a selected FM radio station's SCA channel, and to send the received phase data to CPU 150. The tuner 142 is by no means constrained to receiving only the reference data from one or more active SCA channels. It could also be used to receive other transmitted information of use to the mobile unit, or the system in which the mobile unit is used. An example of such use would be periodically updating the data base of antenna locations kept by the mobile unit. Alternately, a second tuner of similar design to tuner 142 could be employed solely for the reception of reference data.

Local traffic information broadcast over SCA channels is another example of data of use to the mobile unit which is capable of being received by tuner 142. Such traffic information could be of assistance during navigation within, for example, congested metropolitan areas. The single tuner 142 within each mobile unit may thus be employed to perform the functions of receiving broadcast reference data and traffic information over SCA channels, as well as for receiving FM beacon signals.

The CPU 150, under software control uses phase error information received from the PD 144 to compute and store the phase $\Phi$ (at the mobile unit's current position) and delta phase $\Delta\Phi$ of each beacon signal. The software routines 162–168 and data tables 170 used by the CPU to control operation of the mobile unit are stored in a data storage device or devices 180. For example, the software routines may be stored in read only memory, while data tables and other variables are typically stored in high speed random access memory.

The mobile unit 120 may include a display 182 and keyboard 184, or equivalent user interface. In a typical application of the present invention, the user's position will be displayed as a position on a map, with the user being given the ability to zoom the displayed map in and out so as to be able to get different perspectives on the user's location. Alternately, in another application the mobile unit's present or past position(s) may be displayed at a remote location or time on one or more devices. Such displays may be automatically updated periodically, or as requested by a system user. The mobile unit's position may be transmitted in response to requests, or when certain events occur (such as the mobile unit 120 arriving at a selected location).

MAIN CONTROL ROUTINE—MOBILE UNIT

Figure 3:
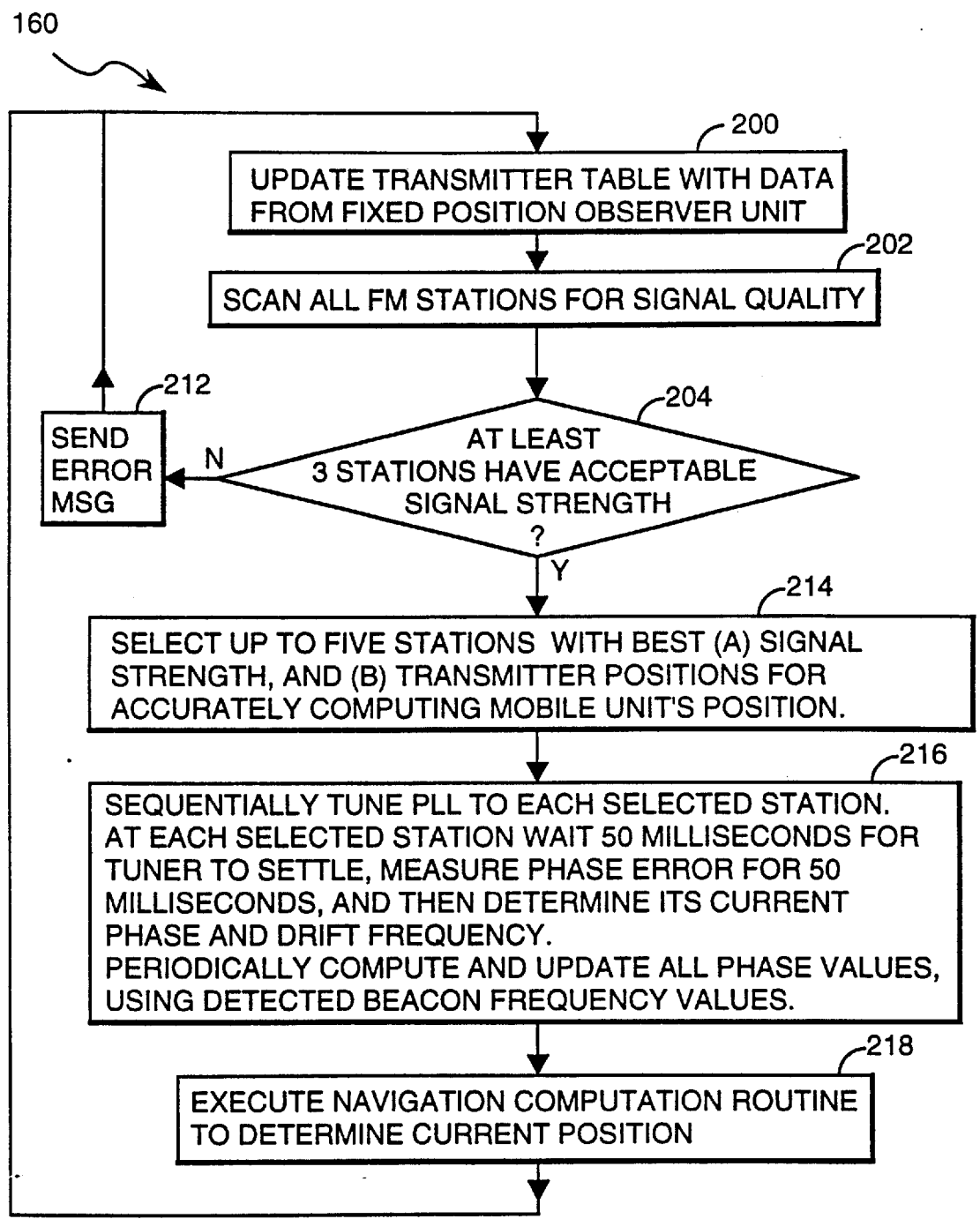
FIG. 3 is a flowchart of the main control routine of a mobile receiver unit.

Referring to FIG. 3, the main control routine 160 of the mobile unit operates as follows. First, the mobile unit 120 tunes to the SCA channel on which the fixed observer unit 110 is transmitting its data, and updates its transmitter data table 170 with the received reference data values (step 200). The reference data from the fixed observer unit is an intermittently transmitted stream of data values in a form such as:

<beacon id 1, observed phase and freq. values 1, ref. time 1>

<beacon id 2, observed phase and freq. values 2, ref. time 2>

<beacon id 3, observed phase and freq. values 3, ref. time 3>

This data is herein referred to as the fixed observer reference data, or simply as the reference data The reference data parameters represent the coefficients of a linear model of each beacon's phase, as a function of time t as defined by the fixed observer. The invention is not limited to a linear model, and those skilled in the art will recognize that other modeling is possible. The generation of linear model coefficients from the phase values measured by the fixed observer is discussed later in the section entitled "Fixed Position Observer Unit".

The parameters of the reference data relate to the linear model of the beacon phase, which can be written in point-slope form. The linear model is:

$$\Theta_n(t_u) = \omega_n \cdot (t_u - t_0) - \phi_n(t_0) \quad (1)$$

where n represents the $n^{th}$ beacon t is the reference time as defined by the fixed observer $t_u$ is $t-\tau$, where $\tau$ is an offset due to receiver propagation delays and clock bias.

$t_0$ is an arbitrarily chosen reference time $\Theta_n(t_u)$ is the estimated phase of the $n^{th}$ beacon signal at its antennae as predicted by the fixed observer $R_n$ is the distance of the fixed observer from the $n^{th}$ beacon's antenna.

$\lambda_n$ is the wavelength of the $n^{th}$ beacon signal (approximately 15,789.5 meters)

$(t_0, \phi_n(t_0))$ is the model's point parameter at an arbitrary instance $t_0$ of the fixed observer time t.

$\phi_n(t_0)$ is the phase at the $n^{th}$ beacon's antenna, which has been adjusted by the fixed observer by removing from the beacon's measured phase the value $2\pi R_n/\lambda_n$, where $\lambda_n$ is the wavelength of the $n^{th}$ beacon.

$\omega_n$ is the model's slope parameter, which is equal to the radian frequency of the $n^{th}$ beacon signal.

It can be seen that by using this model the mobile observer can derive an estimate of the $n^{th}$ beacon's phase at an arbitrary time t.

The reference data need not be limited to just the model coefficients. Those skilled in the art will recognize that other data for ancillary purposes could also be included, for instance time sync data, other fixed observer transmission frequency information, etc. In the preferred embodiment, the transfer or communication of the reference data is done in such a manner as to minimize the amount of bandwidth required.

As mentioned previously, the inclusion of an absolute positioning receiver (e.g., a GPS receiver) within each mobile unit enables computation of the reference data within the mobile unit itself, thereby obviating the need for a fixed observer. Before continuing further, a description will be provided of a reference data computation technique which utilizes the absolute position information produced by a GPS receiver disposed within the mobile unit.

As is described in detail in a later section, in a preferred embodiment the uncoordinated beacon signal receiver 124 within each mobile unit is configured with hardware and signal processing software for detecting the phase of FM pilot signal received from existing FM radio stations. The signal processing software includes a routine for converting the detected phase of each FM pilot signal into a phase value at the position of the beacon's transmitter antenna at a selected reference time $t_0$. This is simply a matter of computing a phase shift based on the distance between the mobile unit and the transmitter antenna, and the difference between the reference time $t_0$ and the time that the phase was measured. Since the position of each FM radio station transmitter is known, these positions may be stored in a database within each mobile unit. The distance between the mobile unit and each FM radio station transmitter is determined by comparing the mobile unit's absolute position, as determined by the GPS receiver therein, to the coordinates of each FM transmitter stored within the mobile unit's database. The requisite phase shift computation is shown by Equation (2):

$$\phi_n(t) = \Phi_n(t_0) + \frac{2\pi Rn}{\lambda} \quad (1)$$

where $\Phi_n()$ is the phase observed at the mobile unit $\Phi_n()$ is the computed phase of the nth beacon signal at its antennae Note that $\lambda$ is the wavelength of the received signal where $\lambda = c/(19,000 + \omega'/2\pi)$ and $\omega$ is the drift frequency measured at the mobile unit.

The main control routine for determination of the reference data at the mobile unit proceeds as follows. First, the GPS receiver determines an estimate of the absolute position of the mobile unit at which the beacon signals (i.e., FM pilot signals) are to be received. The uncoordinated beacon receiver within the mobile unit then scans all the available FM stations to find those with sufficient signal quality for further processing.

For each station with acceptable signal quality (strength and antenna position), the uncoordinated beacon receiver measures the phase of its beacon signal (i.e., its 19 KHz pilot tone) at the known absolute position of the mobile unit. Then it computes the phase of that beacon signal at the transmitting antenna's position, at a selected time $t_0$, using Equation (2), above, and stores the adjusted phase value in a beacon data table within the mobile unit's database. It has been observed that the frequencies and phases of the pilot tones of FM stations are very stable, and that updating the reference data for each beacon signal once every few seconds is more than sufficient to maintain an accurate positioning system.

Each mobile unit uses the reference data which it computes to locally regenerate a set of beacon signals with coordinated phases, closely replicating the actual beacon signals at positions of their antennae. Thus each mobile unit's reference data allows it to locally regenerate accurate replicas of the beacon signals. Since the relative phases of the beacon signals are known, the beacon signals are effectively coordinated beacons. The mobile unit mixes each of these regenerated beacon signals with the corresponding received beacon signal thereby producing a high accuracy phase value for each beacon signal. A navigation routine within the mobile unit may then compute the mobile unit's absolute position, in the coordinate system of the beacon antennae, based on the se phase values.

Returning again to a discussion of the linear phase model maintained within each mobile unit, the structure of a representative beacon data table stored in the mobile unit's memory 180 is shown in Table 1. It is noted that the use of higher-order phase models may allow for improved position determination accuracy during the intervals between the intermittent updates of absolute position provided by the APS receiver. In an exemplary third-order phase model, the rate of change of frequency (i.e., frequency drift) is monitored in addition to the other parameters set forth in Table I.

Note that in Table 1, Beacon_ID is the frequency, in megahertz, of the carrier signal. T_LOCTN indicates the position of the beacon's transmitter in terms of a predefined coordinate system. X_Phase is the phase of the signal at the transmitter, at time $T_0$, which is a specific instance of time t, as defined by the fixed observer unit or absolute positioning system. Drift is the difference between the frequency of the beacon signal and the mobile unit's 19 KHz local clock. C_Phase is the phase of the beacon at the mobile unit's current position at the time of the last 100 millisecond time increment. Ac_Phase is the total accumulated phase of the beacon signal, after subtracting off the mobile unit's 19 KHz local clock. Again, for the case of third and higher-order phase models the frequency drift rate (Dft_Rate) may also be determined.

TABLE I

| Beacon ID | T_LOCATN | X_Phase | T0 | Drift | C_Phase | Ac_Phase |
|---|---|---|---|---|---|---|
| 096.5 | X1,Y1,Z1 | 5.11234 | 239.1 | 0.988 | 1.02344 | 43.12224 |
| 102.1 | X2,Y2,Z2 | 1.23339 | 239.2 | 0.010 | 4.49876 | 54.00987 |
| ... | ... | ... | ... | ... | ... | ... |

Referring again to FIG. 3, at step 202 the mobile unit scans FM stations to determine the quality of the beacons of interest. The beacons of interest can be derived from several sources, including A) all possible FM radio frequencies, B) those listed in the beacon data table 170, and C) those associated with the reference data received from the fixed observer or compiled by the mobile unit itself The quality of the beacon is comprised of two separate quality considerations of merit: (A) the caliber of the phase measurements made from the station's pilot tone, and (B) the contribution of error in the navigation solution due to the physical location of the mobile observer with respect to the beacon antennae.

The caliber of the phase measurements are derived from measurements of the phase error signal's variance. A large variance would indicate a poor caliber station, whereas a small variance would indicate a high caliber station. The caliber of the phase measurements is also influenced by how well the DPLL is tracking the beacon. The DPLL will require a finite time period to acquire a new beacon. During this time, the caliber of the phase measurement is less than after acquisition. Additionally, acceleration of the mobile observer will cause a finite tracking error within the phase-locked loop, which results in the caliber being less during periods of acceleration than during periods of constant velocity. The Doppler offset frequency giving rise to this tracking error may be separately monitored in order to improve the measurement caliber.

The contribution of error in the navigation solution due to the physical locations of the beacons' antennae is termed geometrical dilution of precision (GDOP). GDOP results in the magnification of normally inconsequential errors. Generally, GDOP will be minimized by a selection of beacons that are positioned at the widest possible spread of directions from the mobile unit. Note that if the mobile unit's position has been previously computed in the recent past (typically within the last couple of seconds), the approximate position of the mobile unit is known, even if the mobile unit is moving, with much more accuracy than is needed for selecting a set of beacons.

If the mobile unit's position is being computed for the first time since the system was powered on or reset, beacons are selected simply on geographic spread; a better set of beacons would be selected, after the mobile unit's position has been computed, on the next pass through the main routine.

If less than three of the stations have acceptable signal quality (step 204), an error message is sent to the user interface (step 212), and the main routine restarts at its beginning. Otherwise, the stations used for navigation computations are those with the highest quality.

Even though a minimum of three selected beacons will be used at any one time to compute the mobile unit's position, it is preferred to monitor additional stations so that if reception of one of used stations deteriorates, the mobile unit is able to immediately switch to a "spare" station for the purpose of computing its position. The phases of the spare stations are monitored along with the phases of the stations being used to compute the navigation solution. Additionally, the spare stations can be included in the navigation computation to improve the accuracy of its solution. The multiple beacon tracking ability of the DPLL provides the spare station capability at no additional cost.

Next, in the preferred embodiment the tuner is sequentially tuned to each of the selected beacons for a period of 100 milliseconds per station. Considering the handling of a particular beacon during this 100 millisecond period, the first 50 milliseconds are utilized to allow the tuner to settle, and during the second 50 milliseconds, phase error values from the PD 144 are accumulated in a register 409 (see FIG. 8) for use by the loop filter routine 406 (see FIGS. 8 and 9). The accumulated phase error values are then used to compute the drift frequency, the delta phase, and the phase of the pilot signal (step 216). These phase values then update that particular beacon's data in the beacon data table 170. Also computed and stored in the beacon data table 170 are its current phase and accumulated phase (C_Phase and Ac_Phase in Table 1).

The other selected beacons are then adjusted using their previously collected data values so that their accumulated phase values all represent the phase of the corresponding pilot signals at a consistent instance in time. This is done simply by adding or subtracting the phase shift associated with the proper number of 100 millisecond intervals. Note that if the pilot signal's frequency were to be exactly 19,000 hertz, the pilot signal's accumulated phase at time T and its value at time T+100 milliseconds are the same. Therefore, to adjust a beacon signal's stored phase value for the passage of 100 milliseconds of time, the mobile unit's CPU just adds 0.1 times the value of the pilot signal's drift frequency to the previously stored phase value.

Figure 4:
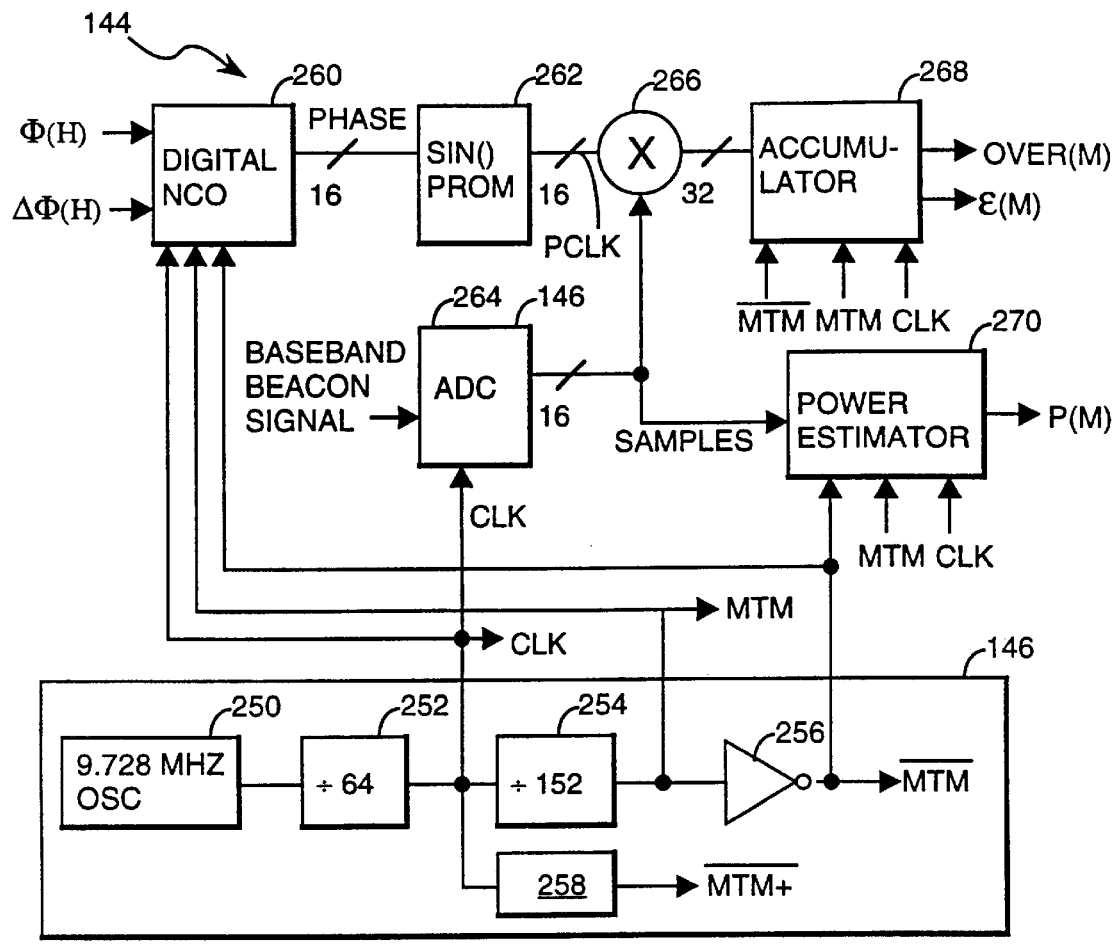
FIG. 4 is a block diagram of a digital phase detector for use in both mobile receiver units and a fixed position observer unit.

The DPLL is made agile by the combination of tuning the radio receiver and loading the corresponding beacon's current phase value (from the beacon data table 170) into a digital numerically controller oscillator (NCO) 260 (FIG. 4).

The manner in which the frequency and phase of each pilot signal are computed is discussed in more detail below with respect to FIGS. 4 through 11.

On a periodic basis (e.g., once per second), a navigation routine 168 is executed that computes the mobile unit's current position (step 218) based on the data stored in the beacon data table 170. The measurement of phase by the DPLL continues to operate in parallel with the navigation routine.

PHASE DETECTOR CIRCUIT

The digital phase-locked loop (DPLL) used by the preferred embodiment is implemented with a digital phase detector 144, and a software loop filter. The DPLL can measure a beacon's phase with an error on the order of 0.000096 radians. Since the wavelength of a 19 KHz signal is about ten miles (actually 15,789.5 meters), this level of precision is necessary to achieve a resolution of about one fourth of a meter.

A single phase detector 144, coupled to a single receiver/tuner, is used to process all the selected pilot signals. By using the same physical circuitry for all signals, approximately the same phase delay through the circuitry occurs for all received signals. This common mode phase delay is eliminated by the navigation algorithm. A differential mode phase error of even 0.01 radians, due to differing propagation delays for distinct tuner and/or phase detector circuits, would cause a positioning error on the order of 25.1 meters. Thus, using a single tuner and phase detector helps to minimize positioning error.

Referring to FIG. 4, inputs to the phase detector (PD) 144 are the baseband pilot signal from the tuner 142, plus the following signals:

CLK a clock signal running at 152 KHz (i.e., eight times faster than a 19 KHz pilot signal);

MTM a clock signal running at 1 KHz and which is enabled during only one of each 152 cycles of the CLK signal;

$\overline{\text{MTM}}$ the inverse of MTM;

ΔΦ the last computed delta phase of the pilot signal being processed; and

Φ the predicted phase of the pilot signal at the beginning of the next one millisecond signal processing period.

The clock generator 146 uses an oscillator 250 and divider 252 to generate the 152 KHz CLK signal, followed by a counter circuit 254 that generates the MTM signal, and an inverter 256 that generates $\overline{\text{MTM}}$. A parallel circuit 258 generates a delayed one millisecond clock signal $\overline{\text{MTM}}$+ that is delayed from the $\overline{\text{MTM}}$ clock by about 0.000003289 seconds (i.e., by one half cycle of the 152 KHz CLK signal).

The choice of a 9.728 MHz clock oscillator 250 and (divide by 65) divider 252 circuits was not arbitrary, but represents the operating frequency region in which quartz crystals can be cut so as to be the most stable over time. Thus the preferred embodiment utilizes inexpensive yet stable components for the clock generator 250.

A digital numerically controlled oscillator (NCO) 260 generates a linearly increasing signal (modulo $2^{32}$) called PHASE, which not only increases at a frequency (19000+ ΔΦ/152000) closely matching that of the pilot signal, but also starts at a previously computed phase value Φ stored in beacon data table 170. The PHASE value is converted into a sinusoidal signal PCLK by using the PHASE value as the address of a SIN() function table stored in a PROM 262. The PCLK signal is, in essence, a reference clock that will be compared by the Phase Detector 144 with the baseband beacon signal.

In parallel with the NCO 260 and PROM 262, an analog to digital converter (ADC) 264 samples the baseband pilot signal at a rate of 152 KHz. Each sampled pilot signal value is multiplied with a corresponding sample of the PCLK signal by multiplier 266. During each one millisecond period, 152 consecutive multiplication products are received and added to one another by accumulator 268, generating a new phase error value $\epsilon(M)$ once every millisecond.

In both the hardware and software diagrams and equations in this description, the index value M indicates that a new value of the indexed quantity is generated every millisecond.

POWER ESTIMATOR CIRCUIT

Power estimator circuit 270 also receives the samples of the pilot signal, and generates a power estimation value P(M) once each millisecond. The power estimator circuit 270 allows for determination of changes in recovered power level arising from spatial motion of the mobile unit and from variation in modulation content. Such variation in modulation content can occur, for example, due to operation of the beacon transmitter's automatic gain control (AGC) circuit during the transmission of strong signals (e.g., a bass note). The power estimator circuit 270 improves pilot signal phase measurements by accounting for "shifts" in the pilot tone resulting from changes in recovered power level.

Figure 5:
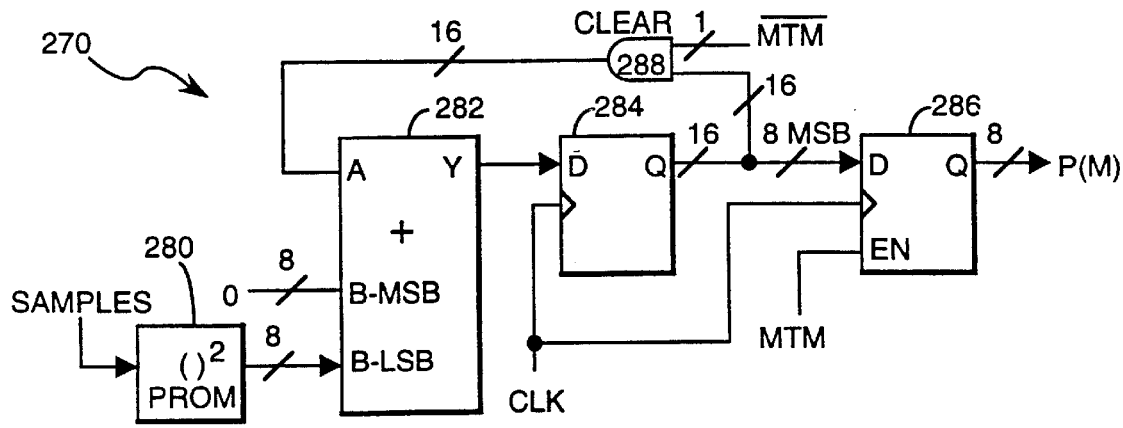
FIG. 5 is a circuit diagram of a power estimator circuit.

As shown in FIG. 5, the power estimator 270 first multiplies each pilot signal sample by itself using a PROM 280 storing an appropriate set of values. The resulting squared values are added to one another for 152 consecutive CLK clock cycles by adder 282 and flip-flop 284, and the most significant eight bits of the resulting total are loaded into flip-flop 286 to generate the value P(M). The P(M) value is held for one millisecond, providing a period of time in which it can be read and stored by the unit's CPU 150.

The accumulated power value held by the power estimator circuit 270 is cleared once every millisecond by turning off AND gate 288 with the MTM signal, thereby loading a value of zero into the A port of adder 282.

DIGITAL NUMERICALLY CONTROLLED OSCILLATOR (NCO)

Figure 6:
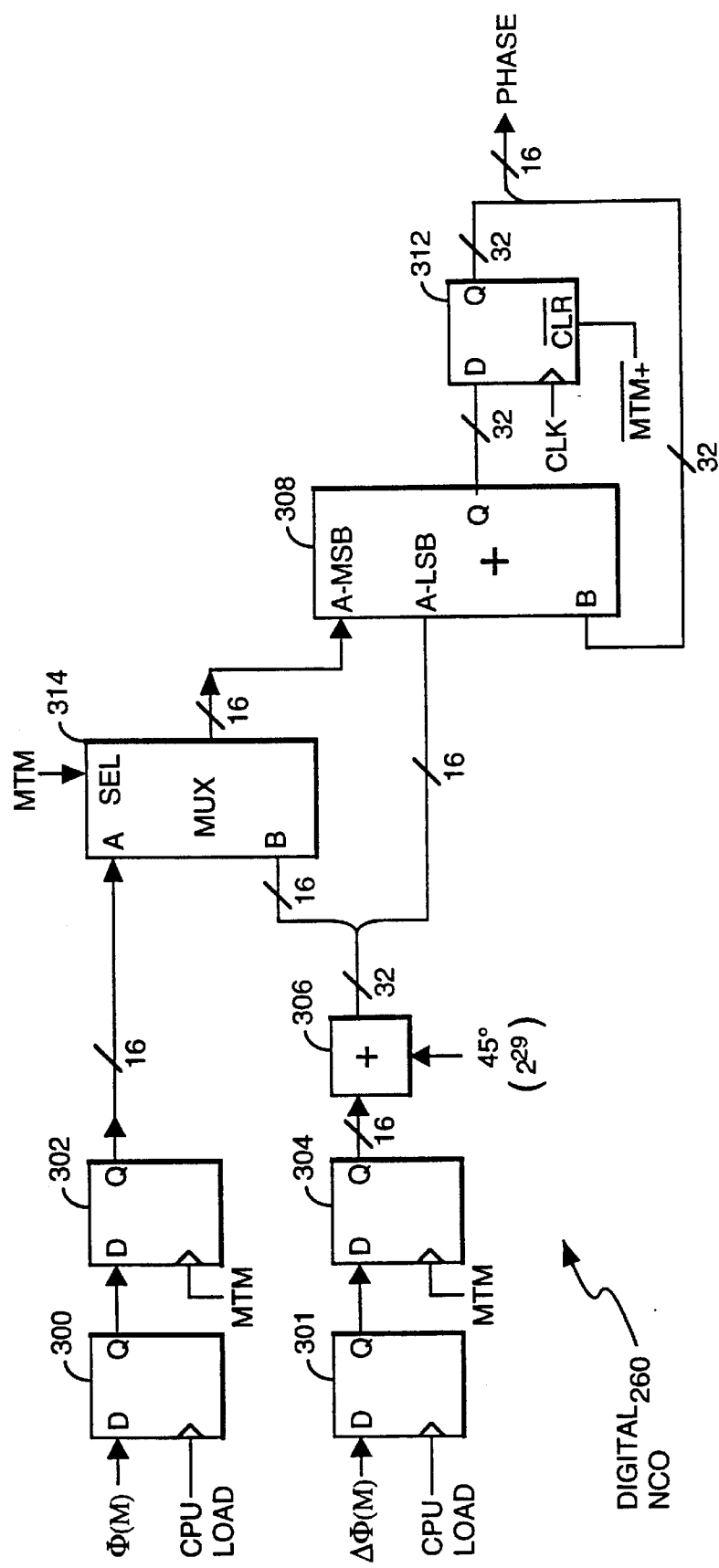
FIG. 6 is a circuit diagram of a numerically controller oscillator (NCO).

Referring to FIG. 6, the digital NCO 260 works as follows. Only one beacon signal is sampled and analyzed during each 100 millisecond period in order to produce a phase, delta phase, and drift frequency value. The digital NCO 260 generates new PHASE values 152 times per millisecond, using a new starting phase value once every millisecond.

The theory of operation of the Digital NCO is as follows. The digital NCO 260 generates a PHASE value which is updated, or incremented, about eight times per 19 KHz clock cycle. This PHASE value tracks, as accurately as possible, the phase of a selected beacon signal using a previously measured drift frequency value.

As implemented here, the beacon signal's frequency has two components: (1) a 19 KHz component, which causes the phase of the beacon signal to increase by $\pi/4$ radians during each clock period of the 152 KHz CLK signal, and (2) a delta phase component, which causes the phase of the beacon signal to increase by $\Delta\Phi$ during each clock period of the CLK signal. In essence, the Digital NCO circuit 260 computes a value using the following equation:

$$\text{PHASE}(I)=\text{PHASE}(I-1)+\pi/4+\Delta\Phi \qquad (3)$$

where I represents discrete time taken at the 152,000 Hz clock rate.

Prior to the beginning of each one millisecond time slot, the CPU loads a starting phase value $\Phi$ into flip-flop 300 and a delta phase value $\Delta\Phi$ into flip-flop 301. At the beginning of the one millisecond time slot, marked by MTM=1 and MTM=0, these values are shifted into flip-flops 302 and 304. The delta phase value is added by Adder 306 to $2^{29}$, which represents a phase shift of $\pi/4$ radians. Thus, except during the first clock cycle after MTM=1, the digital 32-bit value at input Port A to Adder 308, is equal to $\pi/4+\Delta\Phi$.

The value presented to input Port B of Adder 308 is the previously computed PHASE value, stored in flip-flop 312.

At the beginning of each one millisecond time slot, multiplexer 314 selects port A, thereby presenting the phase value in flip-flop 302 to port A of the adder 308. Flip-flop 312 is cleared by the $\overline{\text{MTM+}}$ signal one-half clock cycle after MTM becomes active. As a result, a value of zero is presented to the B port of the adder 308. At the next clock cycle after MTM=1, the output of the adder is equal to $\Phi+\Delta\Phi$, and that value is loaded into flip-flop 312. For each of the next 151 clock cycles of the CLK signal, a value of $\pi/4+\Delta\Phi$ is added to the previously computed PHASE value and stored in flip-flop 312.

Referring back to FIG. 5, the most significant sixteen bits of the computed PHASE value is converted by the PD 144 into a sine waveform, and then multiplied with the actual beacon signal to generate a phase error value $\epsilon$.

PHASE ERROR ACCUMULATOR

Figure 7:
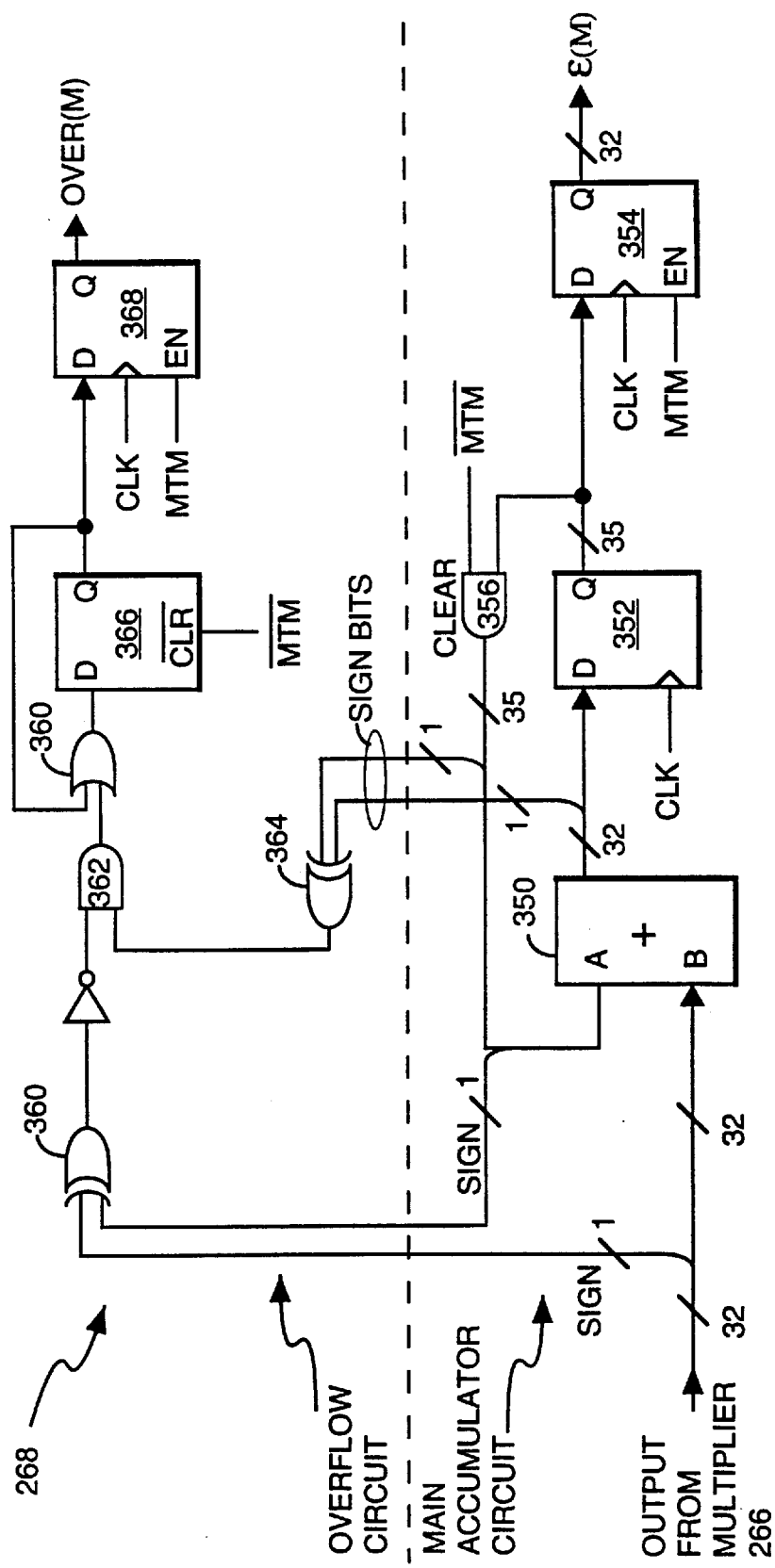
FIG. 7 is a circuit diagram of a phase error accumulator circuit.

Referring to FIG. 7, the main part of accumulator circuit 268 is very simple. The 32-bit values generated by multiplier 266 (see FIG. 4) are accumulated by adder 350 and flip-flop 352 for 152 cycles of the CLK signal, with the resulting total value being stored in flip-flop 354 at the end of each one millisecond cycle. Furthermore, AND gate 356 causes the accumulated value in flip-flop 352 to be cleared at the beginning of each one millisecond cycle and replaced with the next 32-bit value from multiplier 266.

The remaining portion of accumulator circuit 268 is a well known overflow detection circuit which operates by comparing sign bits. In particular, there can be no overflow if the two inputs to adder 350 have different sign bits. Thus, XOR gate 360 puts out a "1" if the A and B inputs to adder 350 have different signs, which disables AND gate 362.

Furthermore, if the previous and current outputs of Adder 350 have the same sign bit value, the Adder did not overflow. Therefore XOR gate 364 outputs a "0" when the previous and current outputs of Adder 350 have the same sign bit value, which disables AND gate 362.

Overflow is detected when (A) the Sign bits of the multiplier input value and the accumulated phase error value in flip-flop 352 have the same sign bit value, and (B) the previous and current outputs of the Adder 350 have unequal sign bit values. When this happens, AND gate 362 outputs a "1", which is stored in flip-flop 366 for the duration of the one millisecond period, and which is then transferred to flip-flop 368 for reading by the CPU 150. The loop filter software ignores phase error values from each one millisecond period in which the accumulator circuit indicates that an overflow condition was detected.

The phase error value $\epsilon$ in flip-flop 354 is read by the CPU 150 for use by the loop filter software.

SUMMARY OF PHASE DETECTOR CIRCUIT FUNCTION

In summary, the PD 144 is tuned to a new beacon signal every 100 milliseconds. After giving the tuner fifty milliseconds to settle, the PD circuit generates three values (estimated signal power, phase error, and a phase error overflow indicator) once every millisecond for fifty consecutive millisecond periods. These values are passed to the CPU 150.

Using previously measured phase and drift values, the software periodically (i.e., once every 100 milliseconds) updates the predicted phase for the other selected beacon signals that are being monitored. As a result, the CPU maintains at all times a phase value $\Phi$, delta phase value $\Delta\Phi$ and drift frequency for all the beacon signals it is using, not just for the one beacon signal that the PD circuit 144 is currently receiving. The procedure for maintaining these phase values will be discussed below, in the section entitled PHASE TRACKING SOFTWARE.

PHASE TRACKING SOFTWARE

Referring to FIGS. 8–11, the phase tracking software (used by both the mobile unit and the fixed observer unit) performs the following functions. An automatic gain control routine 400 low pass filters the signal's power (using low pass filter routine 402), and attenuates the phase error signal by a factor inversely proportional to the beacon signal's power.

Another routine 404 uses the phase and drift frequency to remove 38 KHz noise. The resulting filtered error signal $\epsilon'$ is summed and averaged over fifty one-millisecond periods by routine 409 to generate error signal $\epsilon''$. Loop filter 406 then low pass filters this phase error signal $\epsilon''$ to generate delta phase value ΔΦ and drift frequency value ω. A phase master accumulator routine 408 computes a new phase value in two forms: PMA, which represents the total amount of phase movement of the "drift frequency" portion of the beacon signal since the mobile unit was powered on or reset (i.e., excluding phase movement of the 19 KHz portion of the beacon signal), and Φ, which is the current phase value modulo 2π radians. Observation of this drift frequency over a modest time period (e.g., one minute) has been found to allow determination of the change in ω', which corresponds to the rate at which the frequency ω is evolving with respect to the local time reference.

After computing these values for the beacon signal which was last processed by the phase detector circuit 144, the CPU then updates the phases of the other beacon signals using PHASE update equation Eq. 4:

$$PMA_n(t_M) = PMA_n(t_{M-1}) + \omega_n'(t_{M-1}) \cdot (t_M - t_{M-1}) \quad (4)$$

where $t_M$ is the time to which the $n^{th}$ beacon signal phase is being updated $t_{M-1}$ is the time corresponding to the phase value stored for the $n^{th}$ beacon signal in the CPU's beacon data table $\omega_n'()$ is the radian drift frequency of the $n^{th}$ beacon signal If the stored beacon signal phases are updated once every 100 milliseconds, then $t_M - t_{M-1} = 100$ milliseconds.

Operating on the assumption that each of four beacon signals is processed about once every half second, the CPU needs to store certain state variables so as to enable operation of the software filters. These state variables, listed in TABLE 2 herein, are stored in the beacon data table 170. These state variables, excluding those listed in TABLE 1, are the low pass filtered delta phase value ΔΦ, the low pass filtered signal power value P', and the low pass filtered drift frequency value ω'.

TABLE 2

| Beacon ID | ΔΦ | P' | ω' |
|---|---|---|---|
| 096.5 | 0.03122 | 1.00101 | 0.988 |
| 102.1 | 0.12109 | 1.23339 | 0.010 |
| ... | ... | ... | ... |

Figure 8:
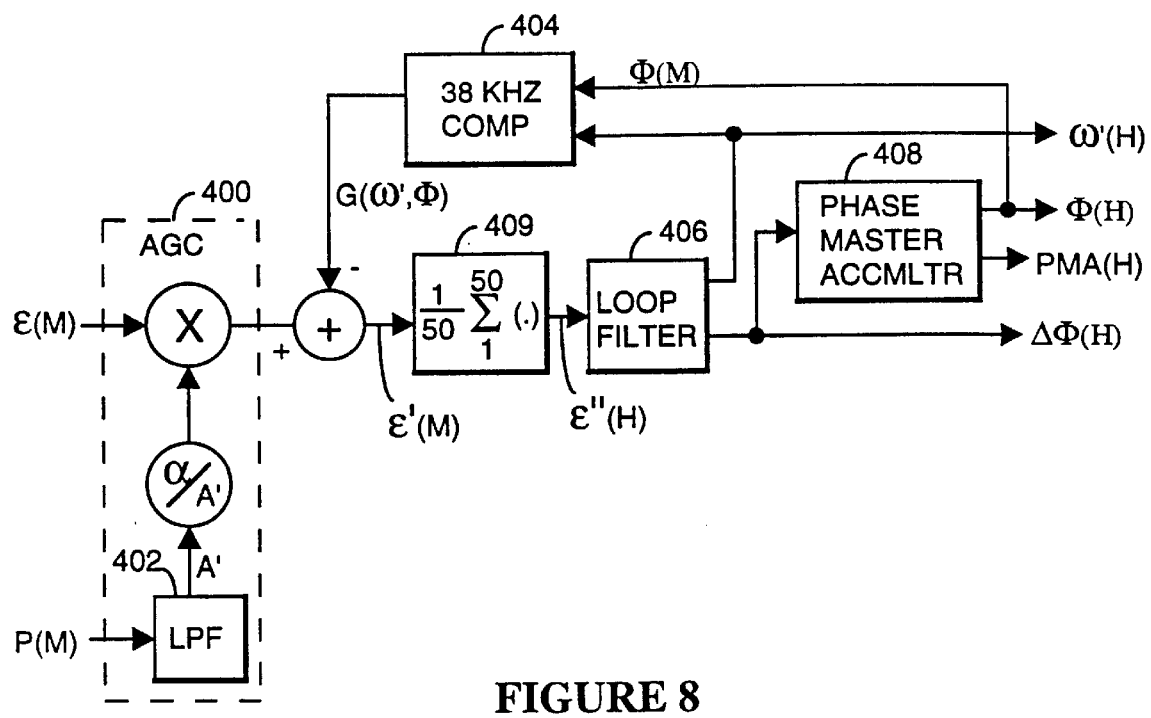
FIG. 8 is a block diagram of a loop filter routine executed by the CPU in mobile receiver units, and also by the CPU in a fixed position observer unit.
Figure 11:
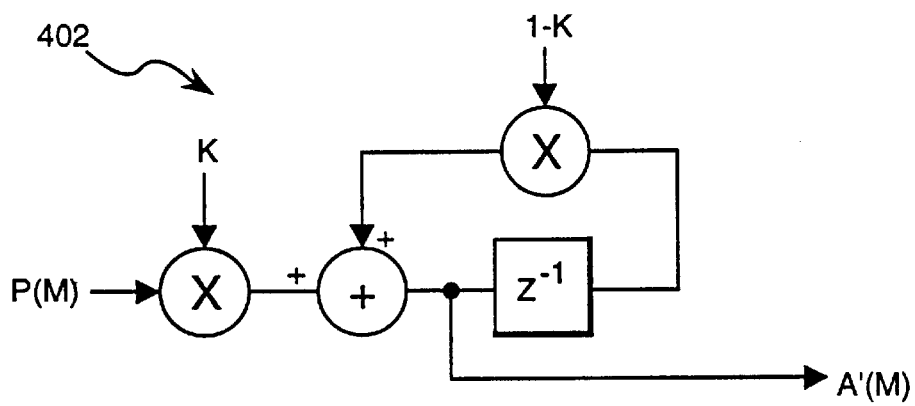
FIG. 11 is a block diagram of a low pass filter routine.

Referring to FIGS. 8 and 11, the signal power P(M) of the beacon signal is low pass filtered to generate a filtered power value P'(M):

$$P'(M) = K \cdot P(M) + (1-K) \cdot P'(M-1) \quad (5)$$

where P(M) is the most recently measured signal power value, P'(M−1) is the previously computed filtered power value, and K is a preselected filter parameter having a value selected for proper bandwidth. A typical value of K is less than 0.1.

The amplitude of the sinusoid is recovered from the power measurement by the following equation:

$$A'(M) = \sqrt{P'(M)/\beta}$$

where A'(M) is the amplitude, P'(M) is the sinusoidal power, and β is a scaling constant, typically about 56.

The AGC routine 400 attenuates the phase error signal ε by a factor of α/P', where α is an attenuation factor selected for unity loop gain and A' is the low pass filtered signal amplitude.

Next, routine 404 removes 38 KHz noise from the phase error signal ε. In particular, when the multiplier circuit 266 in the PD 144 multiplies a computed waveform with the actual beacon signal, two signal components are generated: a low frequency component with a frequency equal the difference between the two signals, and a high frequency component with a frequency equal to the sum of the two frequencies. After filtering by the accumulator 268, this second component is small, though it is still significant enough to distort the phase error signal ε. 38 KHz compensation routine 404 computes a value G(ω',Φ), corresponding to the unfiltered residual high frequency component of the phase error signal, which is then subtracted by the CPU's software from the phase error signal ε. G(ω',Φ) is computed using the following equation:

$$G(\omega', \Phi) = \frac{\sin(2WT(N-1) + 2\Phi) - \sin(2WTN + 2\Phi) + \sin(2WTN - 2\Phi) + \sin(2\Phi)}{4 - 4\cos(2WT)} \quad (6)$$

where $W = 2\pi \cdot 19000 + \omega'$ $N = 152$ $T = 1/152{,}000$

Figure 9:
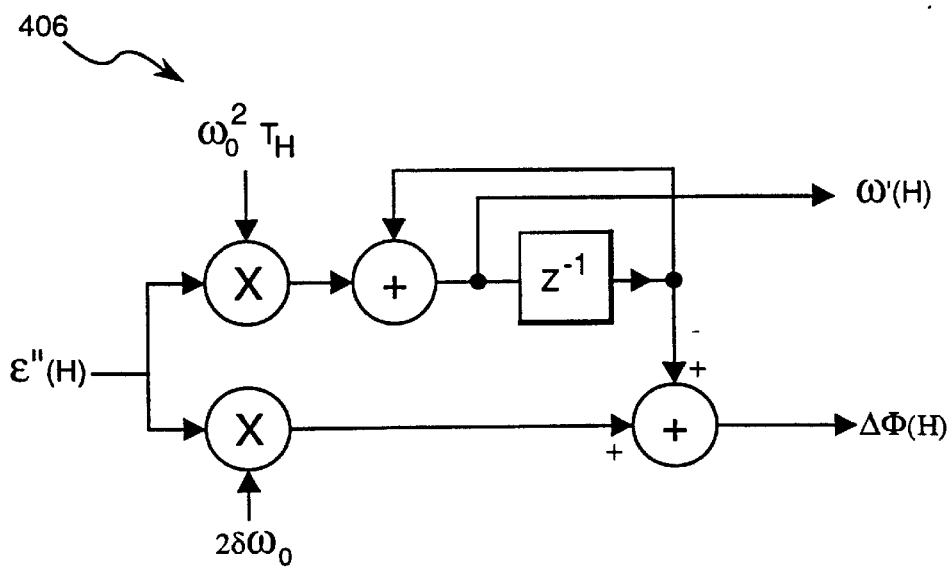
FIG. 9 is a block diagram of a loop filter subroutine.
Figure 10:
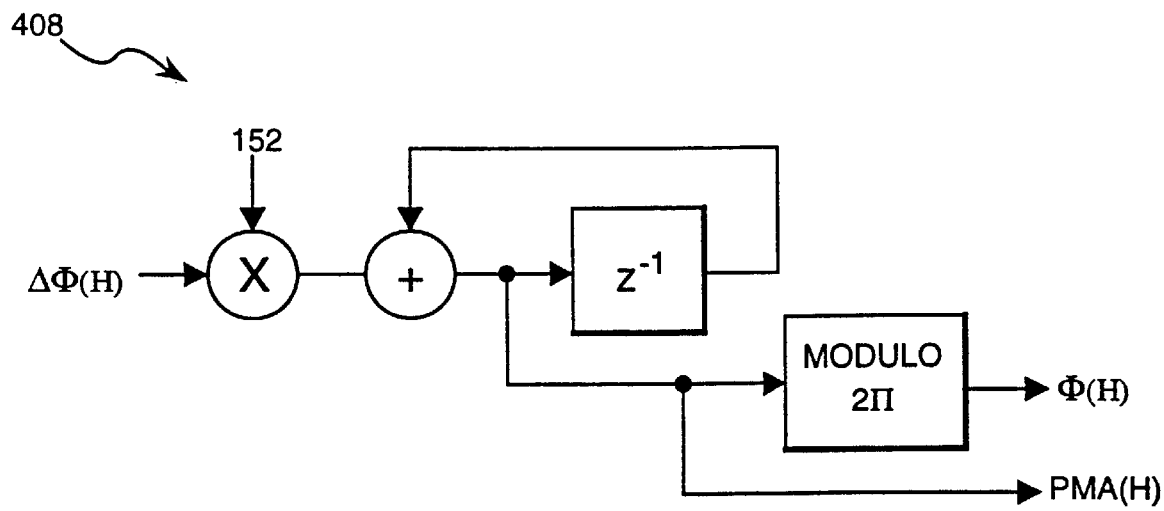
FIG. 10 is a block diagram of the phase master accumulator software routine.

The resulting adjusted phase error value ε' is averaged by low pass filter routine 409 and then processed by a loop filter routine 406, shown in diagrammatic form in FIG. 9. This is a "proportional" and "integrated" signal control routine, in which the delta phase value ΔΦ and drift frequency ω' are periodically updated in accordance with the following equations:

$$\omega'(H) = \omega_0^2 T_H \epsilon''(H) + \omega'(H-1) \quad (7)$$

$$\Delta\Phi(H) = 2\delta\omega_0 \epsilon''(H) + \omega'(H-1) \quad (8)$$

where $T_H$ is the hop rate, i.e., the rate at which each station is examined. In the preferred embodiment $T_H$ is nominally 0.5 seconds. $\omega_0$ is the natural frequency, in the preferred embodiment $\omega_0$ is nominally 0.1 radians per second. δ is the damping coefficient, which in the preferred embodiment is nominally 0.707.

POSITION DETERMINATION

Periodically, after the CPU has computed the current phase value of the selected beacon signals, it determines the mobile unit's current position. In the preferred embodiment, the navigation software 168 is performed concurrently with the mobile unit's signal processing software.

Assuming initially that at least four beacon signals were available, position determination is performed as follows.

The phase $\Phi_n(t)$ of each beacon signal at time t, where n is an index identifying particular beacons is represented as:

$$\Phi_n(t) = \phi_n(t_0) + \omega_n(t_0) \cdot (t - t_0) - \frac{2\pi R_n}{\lambda_n(t_0)} \quad (9)$$

where t is time as defined by the fixed observer, $t_0$ is a specific instance of time chosen by the fixed observer, $\phi_n()$ is the phase of beacon n its antenna at $t_0$ $R_n$ is the distance of the mobile user from the $n^{th}$ beacon's antenna $\lambda_n()$ is the wavelength of the pilot tone (approximately 15,789.5 meters)

$\omega_n()$ is the radian frequency of the $n^{th}$ beacon

A problem with Equation 9 is that $\Phi_n(t)$ is not directly observable. In practice, the mobile unit can observe phase only after it has propagated through its receiver, thus being delayed by an amount $\tau$. In other words, the mobile unit can only observe the phase which occurred $\tau$ seconds in the past. Thus, we modify Equation 8 as follows:

$$\Phi_n(t-\tau) = \phi_n(t_0) + \omega_n(t_0) \cdot (t-t_0) - \frac{2\pi R n}{\lambda_n(t_0)} - \omega_n(t_0) \cdot \tau \quad (10)$$

where $\tau$ is an offset in time at the mobile unit due to clock bias or delays within its receiver.

Equation 10 can be re-arranged to yield:

$$Gn = 0 = \frac{\lambda_n(t_0)}{2\pi} \{-\Phi_n(t_u) + \phi_n(t_0) + \omega_n(t_0) \cdot (t_u - t_0)\} - \sqrt{(x-x_n)^2 + (y-y_n)^2 + (z-z_n)^2} \quad (11)$$

where $t_u = t - \tau$ is the effective time seen by the user $x, y, z$    is the position of the mobile unit at time $t_u$ $x_n, y_n, z_n$    is the position of the $n^{th}$ beacon's transmitter Repeating Equation 11 for four beacons, and suppressing the equations' dependency upon time for the sake of clarity, yields a set of four equations with four unknowns (x,y, z and $t_u$). The resulting vector of equations can be represented as:

$$G = [G1, G2, G3, G4] \quad (12)$$

Further, we define a vector of position variables $p = [t_u, x, y, z]$.

The Jacobian for this set of equations is:

$$J = \begin{bmatrix} \frac{\partial G1}{\partial t_u} & \frac{\partial G1}{\partial x} & \frac{\partial G1}{\partial y} & \frac{\partial G2}{\partial z} \\ \frac{\partial G2}{\partial t_u} & \frac{\partial G2}{\partial x} & \frac{\partial G2}{\partial y} & \frac{\partial G2}{\partial z} \\ \frac{\partial G3}{\partial t_u} & \frac{\partial G3}{\partial x} & \frac{\partial G3}{\partial y} & \frac{\partial G3}{\partial z} \\ \frac{\partial G4}{\partial t_u} & \frac{\partial G4}{\partial x} & \frac{\partial G4}{\partial y} & \frac{\partial G4}{\partial z} \end{bmatrix} \quad (13)$$

Next, we iteratively solve the equation:

$$p_{i+1} = p_i - J^{-1}(p_i) G(p_i), i=0, 1, 2, \quad (14)$$

until x, y, z and $t_u$ converge.

In our system, with well chosen beacons, the Jacobian matrix is always invertible. The individual elements of the Jacobian matrix are numerically computed as follows:

$$\frac{\partial Gn}{\partial t_u} = c = \text{the speed of light} \approx 3 \times 10^8 \text{ m/sec} \quad (15)$$

$$\frac{\partial Gn}{\partial x} = -\frac{x - x_n}{R_n} \quad (16)$$

$$\frac{\partial Gn}{\partial y} = -\frac{y - y_n}{R_n} \quad (17)$$

$$\frac{\partial Gn}{\partial z} = -\frac{z - z_n}{R_n} \quad (18)$$

$$R_n = \sqrt{(x-x_n)^2 + (y-y_n)^2 + (z-z_n)^2} \quad (19)$$

where x,y,z is the position of the mobile unit $x_n, y_n, Z_n$ is the position of the $n^{th}$ beacon's transmitter To solve for the mobile unit's current position, the mobile unit makes a first guess as to the value of the $p = [t_u, x, y, z]$ vector, and assigns that value to $p_0$. Using this value, the sixteen elements of the Jacobian matrix in Equation 13 are computed using Equations 15 through 19. Then the matrix is inverted, and Equation 14 is evaluated to generate a new estimate $p_1$ of the mobile unit's position. This process is repeated until the values of $t_u$, x, y, and z converge. As is well known to those skilled in the art of numerical methods, "convergence" is typically defined as $$(tu_{i+1} - tu_i)^2 + (x_{i+1} - x_i)^2 + (y_{i+1} - y_i)^2 + (z_{i+1} - z_i)^2 < L1$$

or as $$(tu_{i+1} - tu_i) < L2_t, (x_{i+1} - x_i) < L2_x, (y_{i+1} - y_i) < L2_y, \text{ AND } (z_{i+1} - z_i) < L2_z$$

where L1 and $L2_t$–$L2_z$ are preselected convergence criteria.

As can be seen, the above described computational process not only solves for the mobile unit's position {x,y,z}, it also solves for time $t_u$. In other words, the mobile unit has sufficient data from its measurements to compute the value of time, and for this reason, it is unnecessary for the mobile unit to explicitly coordinate its "clock" with that of the fixed observer unit. Conceptually, the $t_u$ value computed by the navigation software 168 represents the amount of elapsed time between the fixed observer's phase measurements and the mobile unit's phase measurement, plus (A) a time value corresponding to phase shifts caused by propagation of signals through the mobile unit and fixed observer receivers, and (B) a time value corresponding to the difference between the clock rates of the mobile unit and the fixed observer unit.

It is important to note that the clock rates of the mobile units do not have to be precisely tuned to that of the fixed observer because any difference in the two clock rates simply becomes a common phase shift for all the received beacons.

NAVIGATION WITH ONLY THREE BEACON SIGNALS

As shown in FIG. 3, the present invention can be used even when only three beacon signals of sufficient quality are available. In that case, the navigation software 168 solves only for time, x and y, and does not solve for the mobile unit's altitude. Instead, it is presumed that the mobile unit is at a mathematically fixed altitude. This is based on the assumption that most user's are not as interested in their altitude as in their latitude and longitude. In the three beacon case, the position vector is $p = \{tu, x, y\}$, and the Jacobian matrix is:

$$J = \begin{bmatrix} \frac{\partial G1}{\partial t_u} & \frac{\partial G1}{\partial x} & \frac{\partial G1}{\partial y} \\ \frac{\partial G2}{\partial t_u} & \frac{\partial G2}{\partial x} & \frac{\partial G2}{\partial y} \\ \frac{\partial G3}{\partial t_u} & \frac{\partial G3}{\partial x} & \frac{\partial G3}{\partial y} \end{bmatrix} \quad (20)$$

Equation 13 remains unchanged, except that the vectors and matrix now have fewer elements, and the iterative process for computing the mobile unit's position remains the same as described above.

USER INTERFACE

The present invention does not require any specific user interface for communicating the computed mobile unit's position. Typically, in motor vehicle applications, the mobile unit's current position will be displayed by indicating a position on a map that is displayed on a computer display device. However, other types of user interfaces may be used, depending on the user's requirements.

INITIALIZING THE NAVIGATION ROUTINE

One characteristic of the invention as described so far is that the system requires an initial estimate of the mobile unit's position that is correct to within a few miles. Given such an estimate, the system as described will use the estimate as an initial guess, and then will quickly converge to the correct user position.

However, the solution to the navigation equations presented above is not guaranteed to be unique. If the initial estimate of position is too far in error, the system may converge to a solution that does not represent true user position but is otherwise consistent with observations. The fundamental cause of this behavior is the fact that the waveform being tracked (i.e., a 19000 Hz sinusoid) has a wavelength of only 15.6 kilometers (about ten miles). That is, once every 15.6 Km, the pilot tone repeats. Without extra information, the system is incapable of determining which cycle of the pilot tone is being received by the mobile unit. Thus, there is a potential ambiguity problem. It is noted, however, that elimination of this ambiguity only requires resolving between successive pilot tone cycles, which entails time resolution of one wavelength. Since the duration of a 19 kHz pilot tone is approximately 50 microseconds, only a relatively modest level of accuracy is needed for ambiguity resolution.

There are several method for obtaining the information required to resolve this ambiguity.

In some implementations, such as systems in which a human operator is always present (e.g., in an automobile navigation system), the system can be programmed simply to ask the user to specify the system's approximate position each time that the system is powered on. Since the wavelength of the beacons is about ten miles, the user needs only to specify the system's position within about five miles. This may be done by displaying a map on a touch screen display and asking the user to indicate his/her position by touching the corresponding position on the screen. For a system used over a wide geographic region, this process could take several steps, for example starting with a national map in which the user specifies the general region of the system, moving then to a map covering a region the size of one or two states, and then moving to a more local map for a final pinpointing of the user's position within five miles.

Given this approximate starting position, the navigation system will collect phase measurement data and then execute its navigation software 168 to precisely determine the system's position with a high degree of accuracy. In one preferred embodiment, the mobile unit's last computed position is stored in non-volatile memory (such as an EEPROM), and that position is used as the $p_0$ value the first time the mobile unit computes its position after power up or reset. Position need be re-entered by the user only when the mobile unit's position changes significantly while the mobile unit is off.

In the preferred embodiment, the mobile unit's position is typically recomputed about every 0.5 seconds. Lower cost implementations, using slower microprocessors, might recompute position less often. Even if the mobile unit is moving at a rather high rate of speed, such as 1000 Kilometers/hour in an airplane, the previously computed position will still be relatively close to the new position, and therefore the computation will typically converge after a few iterations of the above describe computation.

Yet another technique to obtain the required extra information needed to resolve ambiguity involves reducing the degrees of freedom in the system while maintaining the number of beacons used, or alternatively adding beacons. Degrees of freedom are reduced by using external information, notably map data. With map data, for example, one can independently obtain altitude information as a function of x and y position. Using this information, solutions which do not exhibit the proper x, y and z relationships can be discarded. Because of the large wavelength (ten mile) of the preferred waveform, two or more solutions which exhibit the same x, y and z relations are highly unlikely.

A similar approach, herein called the quantized map approach, divides the local region into one or more sections and describes the z axis by using a single number representing the average local altitude for that section. With sufficiently fine quantization, consistent x, y and z solutions are rendered unlikely except for the unique position at which the mobile unit is found.

Yet another technique uses extra information regarding changes in the observed phases as a function of changing system geometry. System geometry is changed either by movement of the mobile unit or by using different beacons, which is tantamount to "beacon movement". User movement allows the system to examine the changes in observed phases as a function of changing position. There may be many solutions consistent with a set of phase observations, but only one will remain consistent in the presence of user movement. After observing user movement for a sufficient period of time, only one solution, the mobile unit's true position, will survive. This is particularly suitable for systems that are mounted on moveable vehicles but which either lack a user interface or in which a user may not be able to specify the system's starting position.

An equivalent approach is to add yet another beacon to take a different constellation of beacons while keeping the number of degrees of freedom the same. If, for example, we wish to solve for x, y, z and time, then a minimum of four beacons are required to solve for all quantities. An infinite number of solutions are available, but this number is rendered finite using the safe assumptions that we are near the surface of the planet and within range of the beacons that the mobile unit receives. This finite number of solutions can be reduced to a single unique answer by using a fifth beacon to resolve which solution is consistent. Plainly, this technique can be extended to use even more beacons. Only one solution will remain consistent, the true mobile unit position.

Another approach to resolving the problem of wavelength ambiguity makes use of an external time reference available to both the fixed observer unit and the mobile units in order to establish a common time basis therebetween. A number of existing absolute positioning systems (e.g., the Global Positioning System (GPS), LORAN), or multiple-access communication systems (e.g., TDMA, CDMA), could potentially serve as the source of a common time reference. In such an approach a time pulse generated by the external system is received by both the mobile units and by the fixed observer unit. Each of the mobile units, as well as the fixed observer unit, "tag" (within 50 microseconds) the externally provided time pulse with the time registered by their respective local clocks at the moment the pulse is received. Assuming a negligible difference in propagation time of the external time pulse to the mobile and fixed observer units, the difference between the times registered by a given mobile unit and the fixed observer unit upon receipt of the external pulse defines an initial time bias, $t_{u,o}$, therebetween. The value of $t_{u,o}$ is then incorporated into the initial position vector $p_o$, where $p_o=[t_{u,o}, x, y, z]$, which is then used to determine the initial entries within the Jacobian matrix defined by Equation 12. In this way the determination of a common time basis between the fixed observer and mobile units facilitates estimation of the initial position of each mobile unit.

This technique for determining time bias between the fixed observer unit and the mobile units may be employed during initialization, as well as periodically during subsequent operation. The method advantageously provides a means for accurately determining time bias should a particular mobile unit be unable to sufficiently track the observed signals.

Figure 13:
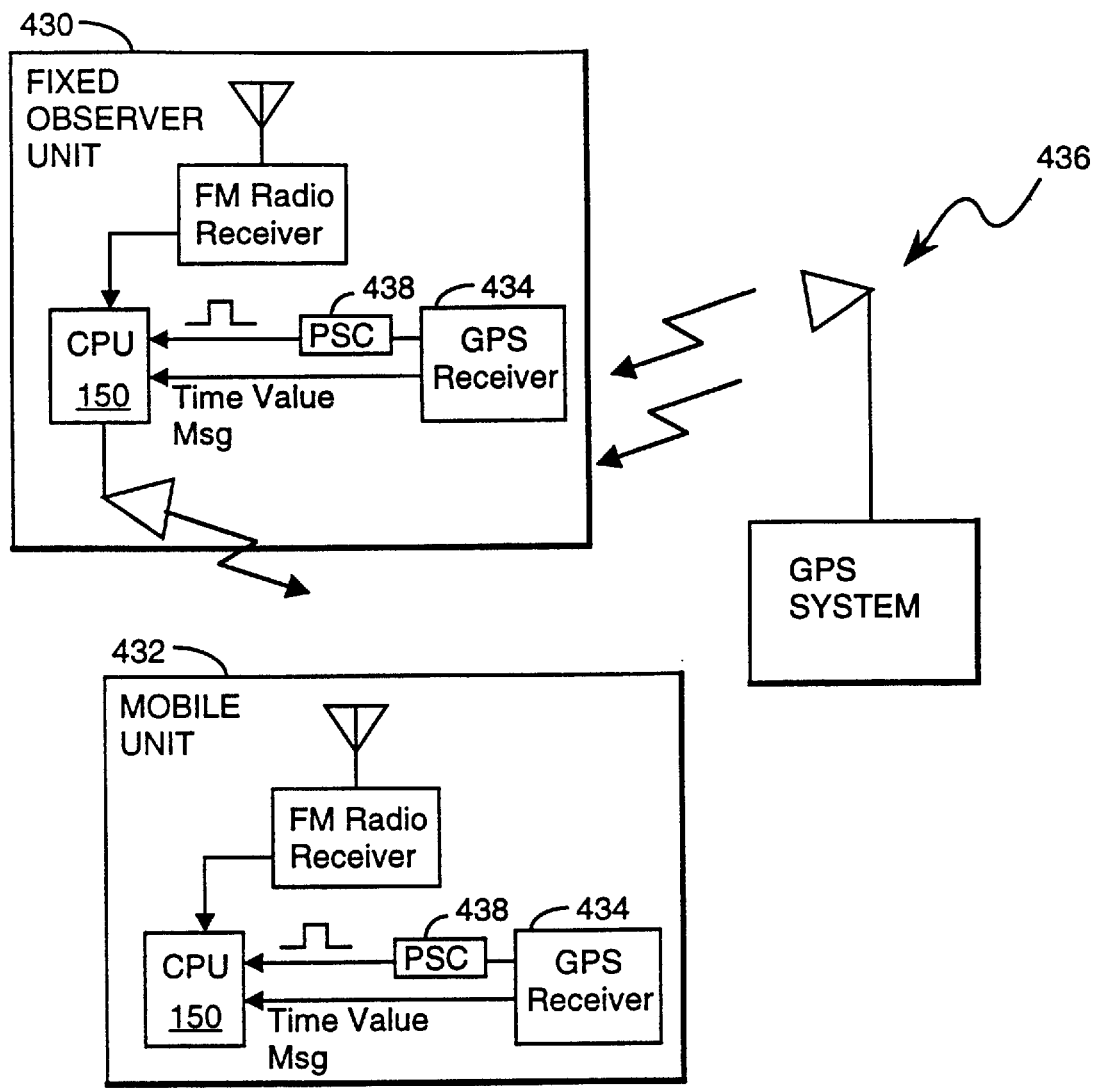
FIG. 13 is a block diagram of a mobile unit, a fixed position observer unit, and an exemplary GPS system in which an initial time bias between the mobile and fixed observer units is established on the basis of timing pulses provided by the GPS system.

Referring to FIG. 13, in one preferred embodiment, the initial time bias ($t_{u,o}$) is established by providing both the fixed observer unit 446 and a mobile unit 448 with conventional GPS navigation units (not shown) capable of detecting the time pulses transmitted by a GPS system 449. A GPS navigation unit possessing such detection capability comprises, for example, the SV-6 GPS Unit, available from Trimble Navigation Limited. This device produces a TTL-type detection pulse of approximately 1 μs in time alignment, to an accuracy of approximately 300 nsec., with each received GPS time pulse. Since in the preferred embodiment of the invention the observed signals comprise FM pilot tones at a frequency of approximately 19 kHz, in order to resolve any wavelength ambiguity the time bias ($t_{u,o}$) should be established to within an accuracy corresponding to one-half of the wavelength of a 19 kHz signal, i.e., to within $(1/19000) \div 2$, or $\approx 25$ μs). Accordingly, a time pulse detection accuracy on the order of 300 nsec. is clearly sufficient in the context of the preferred embodiment.

In the GPS system 449 time pulses are generated once every UTC time second, which is a rate sufficient for purposes of initialization. Each GPS navigation unit also produces, in conjunction with each detection pulse, a message identifying the GPS time corresponding to the received GPS time pulse. The fixed observer 446 and mobile 448 units then each tag each such message produced by their respective GPS navigation units in accordance with the time registered by their respective local clocks.

The tagged fixed observer message produced by the fixed observer unit is then transmitted thereby to the mobile unit 448. Within the mobile unit 448 the "fixed observer time" associated with this transmitted message is compared with the corresponding "mobile unit time" at which this same message was generated by the mobile unit GPS navigation unit. The resultant time difference defines the time bias $t_{u,o}$ between the fixed observer unit 446 and the mobile unit 448.

Given the brief (e.g., 1 μs) duration of the detection pulses typically produced by GPS navigation units, in the preferred embodiment a pulse shaping circuit is employed to extend the duration of the detection pulses. This allows the resultant conditioned pulses to be captured using standard signal capture techniques such as are employed within, for example, conventional oscilloscopes and the like. Such shaping circuits, which often include an RC integration network, are known to those skilled in the art.

Another approach to resolving the problem of wavelength ambiguity makes use of an external reference signal available to both the fixed observer unit and the mobile units in order to establish time synchronization therebetween. Two exemplary implementations of this approach are set forth below.

In a first implementation, both the fixed observer and the mobile unit are disposed to extract RDS information from received FM radio signals. Typically, the call letters of a given radio station are broadcast via an RDS code at rates of 1 to 3 Hz. Upon being recognized with the fixed observer and mobile units, this code would cause an interrupt to be provided to the CPU within each unit. The CPUs within the fixed observer and mobile units would both then read their respective local clocks upon being so interrupted. Since the CPUs within each unit are interrupted substantially simultaneously, the difference in the clock readings corresponds to the offset between the fixed observer and mobile unit clocks. Accordingly, the fixed observer may provide its local time to the mobile unit following each CPU interrupt in order to enable the mobile unit to synchronize its clock to that of the fixed observer. Once the clocks within the fixed observer and mobile units have been so coordinated, the difference between the units' phase measurements may be considered to not arise from wavelength ambiguity.

In a second implementation, both the fixed observer and the mobile unit are equipped with a conventional television tuner. The tuner within each unit would be tuned to the same television station, thereby allowing the same television signal to be recovered by each unit. A "synch stripper" circuit or the like could then extract the vertical synch pulse ($\approx 60$ Hz) from each recovered signal. This pulse would provide an interrupt to the CPU within both the fixed observer and mobile units. The CPUs within the fixed observer and mobile units would both then read their respective local clocks upon being so interrupted.

If the frequency of the synch pulse is much higher than the frequency with which correction information is transferred from the fixed observer to the mobile unit, then the fixed observer may send a CPU interrupt enable pulse over a secondary link (e.g., a dedicated telephone line) to the mobile unit only once after receipt of every N synch pulses. Within the mobile unit, a CPU interrupt would be allowed to occur only upon receipt of both a synch pulse and a CPU interrupt enable pulse. In this way the fixed observer and mobile unit CPUs would only be interrupted, and local time information sent from the fixed observer to the mobile unit, after receipt of each N synch pulses. This allows the local time information to be sent to the mobile unit at the same rate as the fixed observer corrections, which may be a rate significantly lower than the synch pulse rate.

Both of the above implementations would also facilitate identification of spurious clock aberrations within the mobile unit arising from, for example, external shock or vibration.

FIXED POSITION OBSERVER UNIT

Referring to FIGS. 1, 2B, 3 and 12, the fixed position observer unit 110 has the same hardware as shown in FIG. 2B for a mobile receiver unit 120, except that the fixed position unit 110 is coupled to a transmitter for the purpose of sending reference data to the mobile units, as shown in FIG. 1. Furthermore, the signal processing software (i.e., the loop filter, phase master accumulator, low pass filter, and phase update routines) for the fixed position unit is basically the same as the mobile unit's software. As described previously, the functions of the fixed position observer unit may be performed within mobile units equipped with an APS receiver, from which are obtained occasional updates of absolute position.

The navigation routine 168 of the mobile unit is replaced by a routine for converting the detected phase of each beacon signal into a phase value at the position of the beacon's transmitter antenna at a selected reference time $t_0$. This is simply a matter of computing a phase shift based on the distance between the fixed observer unit 110 and the transmitter antenna, and the difference between the reference time $t_0$ and the time that the phase was measured. The required computation is shown by Equation 21:

$$\phi_n(t) = \Phi_n(t_0) + \frac{2\pi R n}{\lambda} \tag{21}$$

where $\Phi_n()$ is the phase observed by the fixed observer $\phi_n()$ is the computed phase of the nth beacon signal at its antennae Note that $\lambda$ is the wavelength of the received signal, where $\lambda = c/(19,000+\omega'/2\pi)$ and $\omega'$ is the drift frequency measured by the fixed observer (see FIG. 8).

Figure 12:
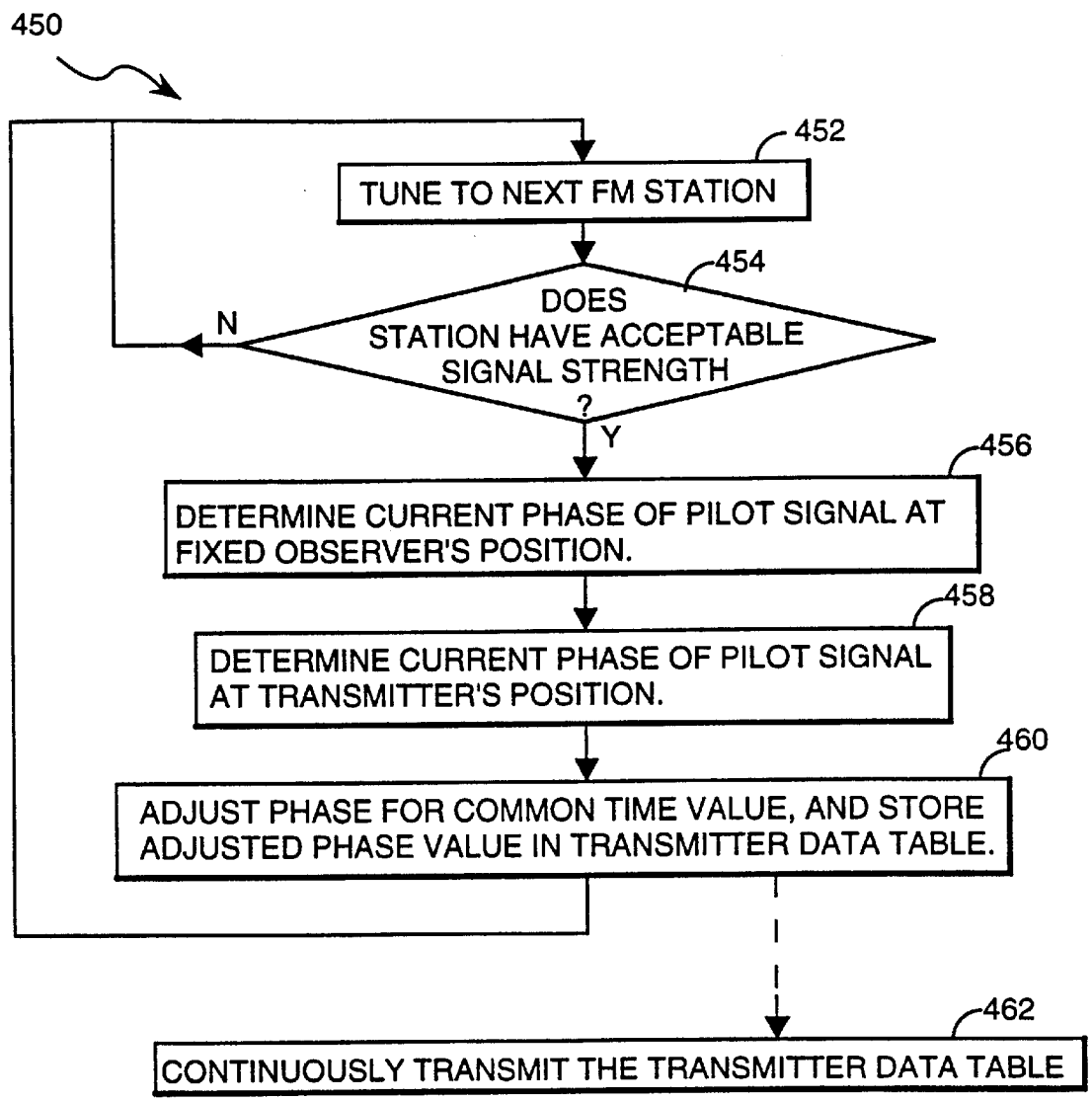
FIG. 12 is a flow chart of the main routine for the fixed observer unit.

Referring to FIG. 12, the main control routine for the fixed observer operates as follows. At steps 452 and 454, the fixed observer unit scans all the available FM stations to find those with sufficient signal quality for further processing.

For each station with acceptable signal quality (strength and antenna position), the fixed observer measures the phase of its beacon signal (i.e., its 19 KHz pilot tone) at the fixed observer's position (step 456). Then it computes the phase of that beacon signal at the transmitting antenna's position, at a selected time $t_0$, using Equation 20, above, and stores the adjusted phase value in a beacon data table (steps 458 and 460). The data values currently in the beacon data table are continuously broadcast to the mobile units. It has been observed that the frequencies and phases of the pilot tones of FM stations are very stable, and that updating the reference data for each beacon signal once every few seconds is more than sufficient to maintain an accurate positioning system.

Each mobile unit uses the reference data from the fixed observer to locally regenerate a set of beacon signals with coordinated phases, closely replicating the actual beacon signals at positions of their antennae. Thus the role of the fixed observer is to provide data that enables the mobile units to locally regenerate accurate replicas of the beacon signals. Since the relative phases of the beacon signals are known, the beacon signals are effectively coordinated beacons. The mobile unit mixes each of these regenerated beacon signals with the corresponding received beacon signal, thereby producing a high accuracy phase value for each beacon signal. The navigation routine then computes the mobile unit's absolute position, in the coordinate system of the beacon antennae, based on these phase values.

DUAL SYSTEM POSITION DETERMINATION

Figure 14:
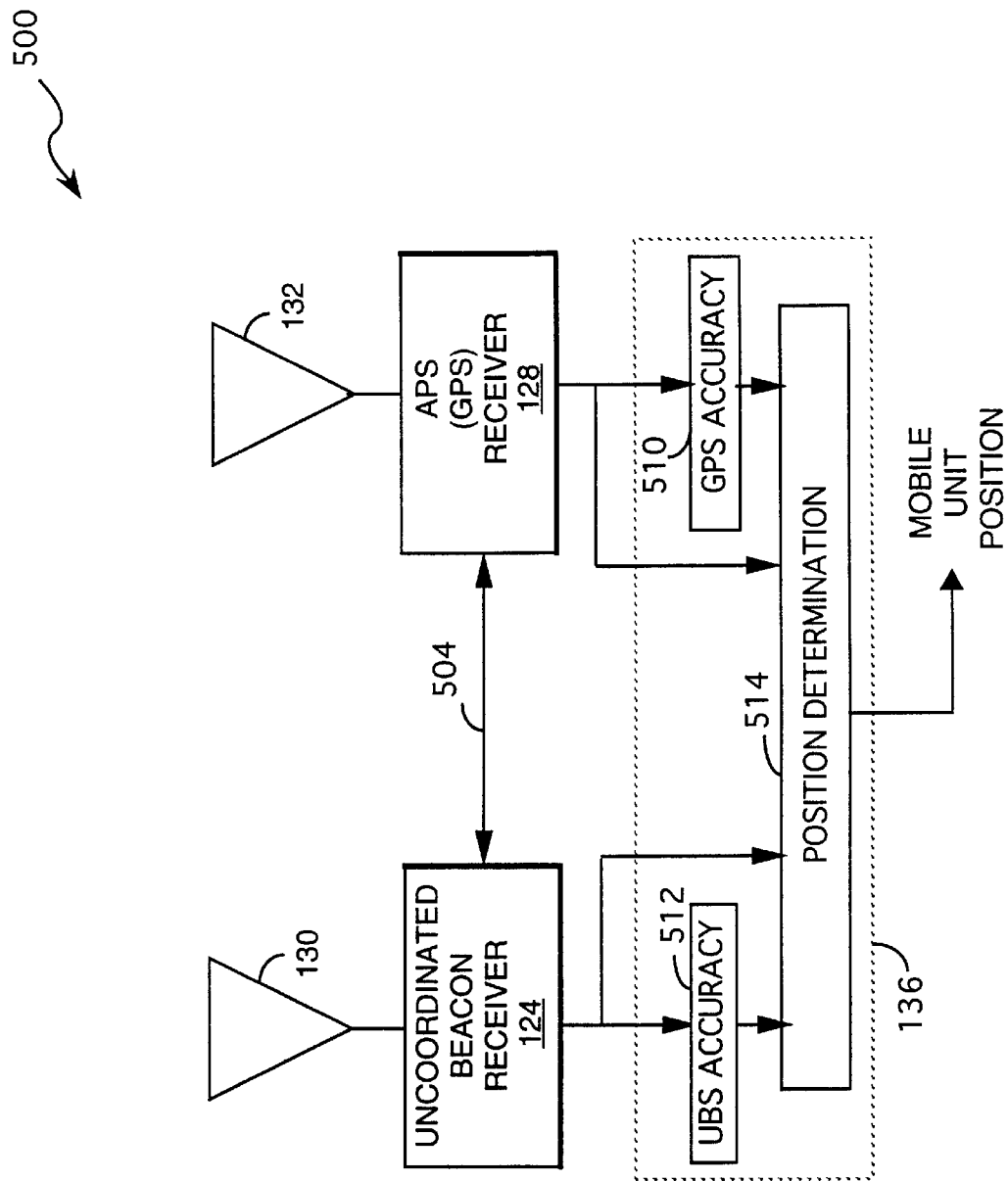
FIG. 14 is a block diagram of a mobile unit which includes a navigation processor configured to provide an estimate of mobile unit position based on location data independently generated by an uncoordinated beacon receiver and an absolute positioning system (APS) receiver.

Referring to FIG. 14, a block diagram is provided of a mobile unit 500 in which the navigation processor 136 is configured to provide an estimate of mobile unit position based on location data independently generated by the uncoordinated beacon receiver 124 and the absolute positioning system (APS) receiver 128. The structure and operation of the receiver 124 has been described in detail herein, and is also disclosed in the aforementioned U.S. Pat. No. 5,173,710. In a preferred embodiment, the APS receiver 128 comprises a conventional GPS navigation unit such as, for example, the SV-6 GPS Unit, available from Trimble Navigation Limited. For clarity of description, the APS receiver 128 will hereinafter be referred to as the GPS receiver 128.

The mobile unit 500 is seen to include a bidirectional data link 504 connected between the uncoordinated beacon receiver 124 and the GPS receiver 128. One possible use of the data link 504 is to provide GPS correction information received by the beacon receiver 124 to the GPS receiver 128. As mentioned above, GPS correction information is broadcast over the subcarriers of existing FM radio stations 102 (FIG. 1). The data link 504 may also be used to provide periodic position updates to the uncoordinated beacon receiver 124. As previously described in the section entitled MAIN CONTROL ROUTINE—MOBILE UNIT, this allows the uncoordinated beacon receiver 124 to compute the beacon signal reference data otherwise required to be determined by a fixed observer unit.

The position data produced by the GPS receiver 128 and the uncoordinated beacon receiver 124 is provided to the navigation processor 136 for use in determination of mobile unit position. More particularly, in a preferred embodiment the position data from the GPS receiver 128 is provided to a GPS ACCURACY software routine 510 within the navigation processor. Similarly, the position data from the receiver 128 is provided to an uncoordinated beacon system accuracy (UBS ACCURACY) software routine 512. The GPS ACCURACY and UBS ACCURACY software routines 510 and 512 respectively provide estimates of the precision of the position data generated by the GPS receiver 128 and beacon receiver 124. As is described herein, the accuracy estimates produced by the software routines 510 and 512 aid in determining whether the position data provided by the GPS receiver 124 or by the beacon receiver 124 is most likely to accurately approximate the position of the mobile unit 500.

In a preferred implementation of the GPS ACCURACY routine 510, the accuracy determination process involves measurement of at least:

(i) received GPS signal quality (e.g., signal strength or signal to noise ratio); and (ii) the dilution of precision (DOP) associated with the arrangement of the GPS satellites from which the GPS signals are received.

In an exemplary embodiment, an estimate of received GPS signal quality is provided by the GPS receiver 124 by monitoring the pseudorange measurements performed thereby. The quality of each pseudorange measurement may be predicated upon, for example, the signal to noise ratio of each recovered GPS signal. Alternately, the coherence between successive pseudorange measurements is compared to a coherence value believed to be reasonable in view of the maximum expected displacement of the mobile user between measurements. In another approach, the bit error rate (BER) of the data recovered from the received GPS signal is monitored over a prescribed time interval as a means of determining pseudorange measurement quality.

The DOP is a dimensionless factor related to the geometric arrangement of the four satellites selected to provide a position estimate. It is known that an arbitrary geometric arrangement of the four selected satellites degrades the solution accuracy attainable with an ideal geometric arrangement. The magnitude of the DOP factor is related to the degree to which a given arrangement of GPS satellites deviates from an "ideal" arrangement, which is characterized by a DOP of unity. For example, if the arrangement of GPS satellites used for obtaining a reported mobile unit position is less than ideal, the magnitude of DOP may be 1.5 in a first direction relative to the reported position, and may be 2.0 in a direction 90 degrees from the first direction. Perhaps the most common type of DOP measurement is known as GDOP, for Geometric Dilution of Precision. The GDOP measurement is related to satellite position as function the three spatial coordinates and time. Other familiar types of DOP measurements include Horizontal DOP (HDOP), Position DOP (PDOP), Vertical DOP (VDOP), and Time DOP (TDOP).

The dilution of precision (DOP) component of the GPS ACCURACY software routine 510 will typically be patterned after a standard DOP computation algorithm, such as described by, e.g., B. Hoffman—Wellenhof, H. Lichtenegger, and J. Collins in *GPS Theory and Practice*, published by Springer-Verlag Wien of New York.

Figure 15:
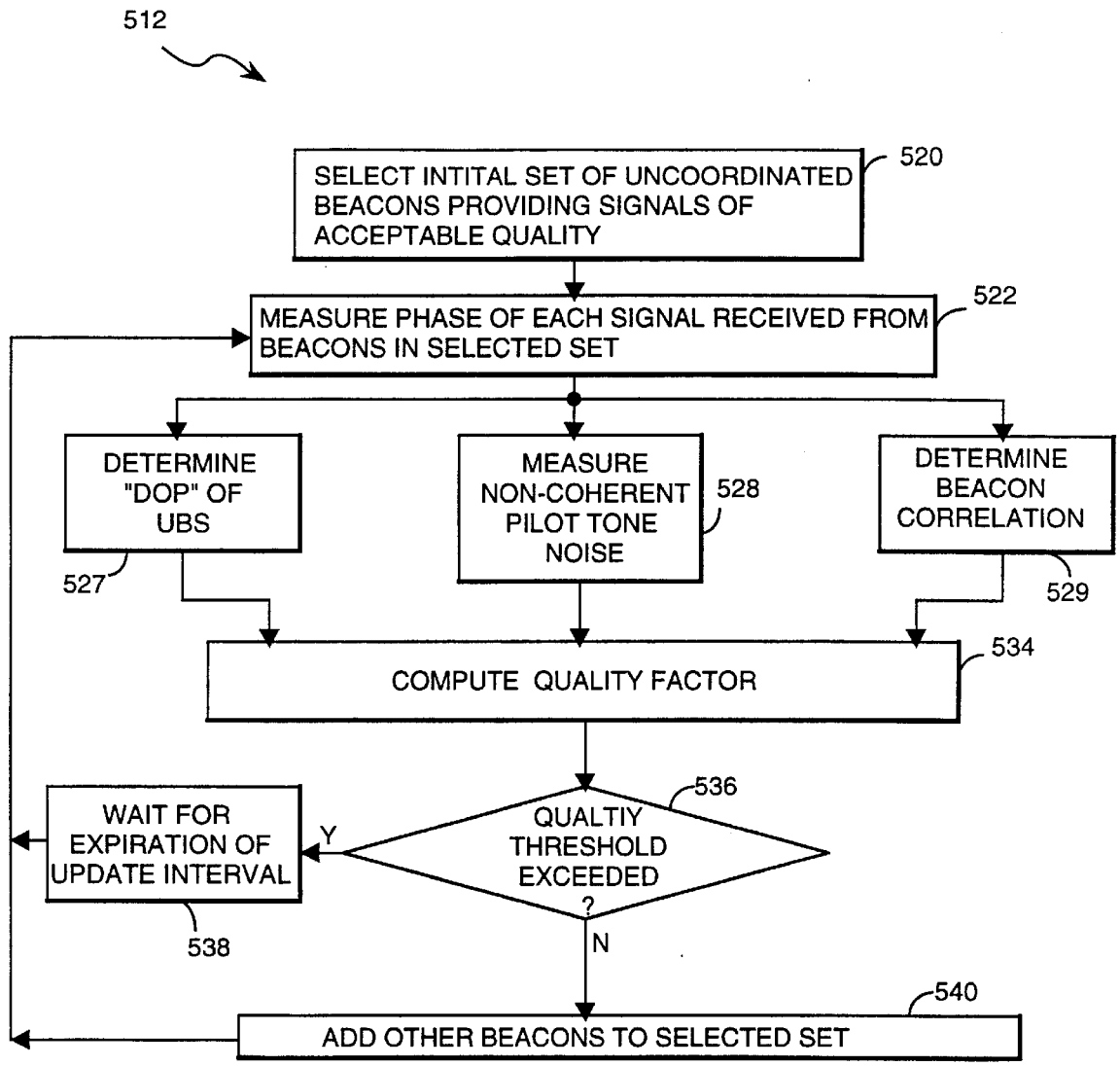
FIG. 15 is a flow chart of an uncoordinated beacon dilution of precision (UBDOP) software routine.

Referring now to FIG. 15, a flow chart is provided of the UBS ACCURACY software routine 512. In the exemplary embodiment, the UBS ACCURACY software routine 512 is disposed to determine a UBS quality factor indicative of the reliability of the position estimate derived from a particular set of uncoordinated beacon signal measurements. The procedure is initiated by selecting an initial set of uncoordinated beacons providing signals of acceptable quality (step 520). In an exemplary embodiment the selected set of beacons will be determined based upon received signal strength and proximity to the last estimated mobile unit position. The phase of the signal received from each uncoordinated beacon within the selected set is then measured (step 522) in the preceding sections. Next, one or more estimates of the quality of the uncoordinated beacon signal measurements are performed (steps 527–529), each of which is described below. The quality estimates obtained during steps 527–529 are then used to determine a composite quality factor (step 534) indicative of the reliability of any position estimate derived using the signals received from beacons in the selected set.

If the composite quality factor exceeds a predefined quality threshold (step 536), the procedure may be repeated after the expiration of an accuracy update interval (step 538). The accuracy update interval is selected in order that the UBS ACCURACY routine 512 is repeated at a desired rate (e.g., 1 Hz). If the quality factor does not exceed the predefined quality threshold, additional "marginal" beacons may be added to the selected set (step 540) and the procedure repeated. In the exemplary embodiment such "marginal" beacons correspond to those not within the selected set which most nearly satisfy the signal quality criteria of step 520.

Considering now steps 527–529 in further detail, one indication of UBS position estimate quality is obtained by executing a UBS dilution of precision (DOP) procedure (step 527) using the uncoordinated beacon signal phase measurements performed in step 522. These phase measurements are used to determine a UBS estimate of the mobile unit's position $\bar{x}$ using equations (9) to (19). The mobile unit's UBS position, $\bar{x}$, may be defined as $(x, y, z, -T_u)$, wherein $T_u$ denotes the clock bias of the mobile unit relative to the fixed observer. Other symbol conventions used in the following description of the UBS DOP procedure are set forth below:

| Symbol | Type of Quantity | Description |
|---|---|---|
| c | Constant | speed of light |
| $\bar{e}_i$ | Unit Vector | mobile user to ith beacon |
| $D_i$ | Vector | mobile user to ith beacon |
| Di | Scalar Range | mobile user to ith beacon |
| $R_u$ | Vector | fixed observer to mobile user |
| $R_u$ | Scalar Range | (fixed observer to mobile user) - $\sqrt{x^2 + y^2 + z^2}$ |
| $R_i$ | Vector | fixed observer to ith beacon |
| $\rho_i$ | Scalar | ith beacon differential pseudorange from user to the fixed observer |
| $\gamma_u$ | Scalar | mobile user phase measurement |
| $\gamma_{FO}$ | Scalar | fixed observer phase measurement |
| $\eta$ | Scalar | noise |

The following range equation (U1) and pseudo-range measurement equation (U2) are formulated and evaluated during execution of the UBS DOP procedure:

$$R_u = R_i - D_i, \text{ and} \tag{U1}$$

$$\rho_i = \theta_M - \theta_{FO} = R_i - D_i + T_u + \eta_i = \sqrt{R_{i1}^2 + R_{i2}^2 + R_{i3}^2} - \sqrt{(R_{i1} - x)^2 + (R_{i2} - y)^2 + (R_{i3} - z)^2} + T_u + \eta. \tag{U2}$$

Forming a scalar range equation from the vector equation (U1) by premultiplying by $\bar{e}_i$, and substituting the result into (U2) yields:

$$\rho_i = \bar{e}_i \bar{R}_u + T_u + \eta_i \tag{U3}$$

Now defining $$L = [(\bar{e}_i)_m I_m]$$

and $$\bar{\rho} = (\rho_i),$$

equation (U3) becomes $$L\bar{x} = \bar{\rho} \tag{U4}$$

where each row, $\bar{L}_i$, of the matrix L is given by:

$$L_i = [(R_{i1} - x)/D_i, (R_{i3} - z)/D_i, 1]$$

The position dilution of precision (PDOP) associated with the measurements used in computation of the position vector x is given by:

$$PDOP = \|\text{Diag}(L^T L)^{-1}\|,$$

which indicates that the PDOP value is defined by the square root of the sum of the squares of the diagonal elements of $(L^T L)^{-1}$.

If the matrix $L_H$ were instead constructed to relate two-dimensional (x, y) position on a flat earth surface to the measured pseudoranges $R_i$, then the value of the horizontal dilution of precision (HDOP) would be defined as:

$$HDOP = \|\text{Diag}(L_H^T L_H)^{-1}\|$$

As is indicated by FIG. 15, any PDOP or HDOP value determined using this procedure is made available for use in determination of the composite quality factor (step 534).

A second approach to estimating the quality of UBS position solutions (step 528) involves monitoring the amount of noise power received by the UBS receiver 602 (FIG. 16) due to noncoherence of the received pilot tone. In this regard the non-coherent pilot tone power ($P_{NCP}$) is defined as the difference between the power of the received pilot tone spectrum and the power of the coherent pilot tone. Since such noncoherent pilot tone power will lead to measurement error, measurement of its value provides an estimate of the quality of the UBS position solution. The value of the $P_{NCP}$ may be expressed as follows:

$$P_{NCP} = \int_{t}^{t\Delta t} (1/\Delta t)\sin(2\pi f\tau + \eta_{(\tau)}) \cdot \cos(2\pi f\tau + \eta_{(\tau)}d\tau \approx \sigma_\eta^2$$

where f is the received pilot tone frequency of 19 KHz±2 Hz, and where a white Gaussian noise term ($\eta_T$) is employed to model incoherence in the received pilot tone. In the exemplary embodiment the received pilot signal spectrum is 4×oversampled at rate of 76 KHz. Accordingly, the sin(*)·cos (*) quadrature multiplication within the integral expression for $P_{NCP}$ may be computed by multiplying the value of each 76 KHz sample by the previous sample. The resultant product terms are summed, and the summation normalized by dividing by the number of product terms accumulated during the measurement interval. The computed value of $P_{NCP}$ may then be used in determination of the composite quality factor (step 534).

Figure 16:
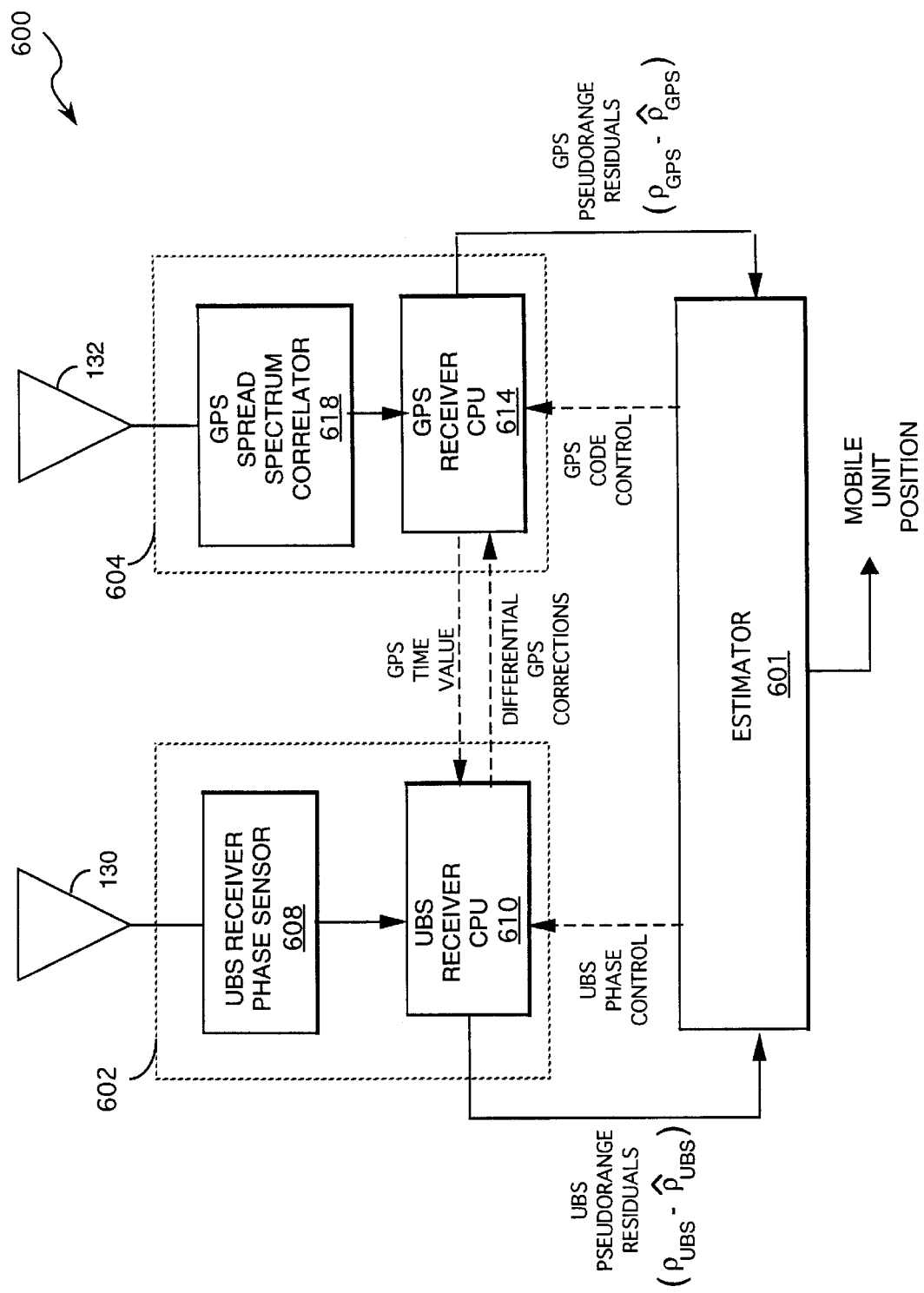
FIG. 16 is a block diagram of a mobile unit in which the navigation processor is programmed to provide an estimate of mobile unit position based on pseudorange measurements provided by uncoordinated beacon system (UBS) and global positioning system (GPS) receivers.

The computed value of $P_{NCP}$ is related to the variance of the sequence of phase residual values output, during the beacon phase measurement process (step 522), by PLL tracking circuitry within the UBS receiver phase sensor 608 (FIG. 16). Such PLL tracking circuitry may be implemented using, for example, the digital phase detector 144 (FIG. 2B). Each phase residual value is obtained subtracting the current PMA phase value (equation 4) from the instantaneous phase value Φ provided by the digital phase detector 144. If the variance among a set of phase residuals computed during the beacon phase measurement process is represented by $\Theta^2$, then:

$$\Theta^2 = W_i B_L / P_S,$$

where $W_i$ is representative of the power spectral density of the receiver noise floor, $P_S$ represents the received signal power, and $B_L$ is the known bandwidth of the PLL tracking circuitry. For a known PLL bandwidth ($B_L$) the value of $\Theta$ thus provides an indication of SNR, and hence also of the quality of the UBS position estimate.

As an example, consider the case in which the UBS receiver 602 is disposed to receive an FM pilot tone of 19 KHz within a 1 KHz receive band between 19±0.5 KHz. If $P_{NCP}$, which for present purposes may be assumed equivalent to $P_S/W_i$, is measured to be 50 dB-Hz for this receive band, then for a 100 mHz tracking bandwidth ($B_L$):

$$\begin{aligned}\theta &= \sqrt{\frac{W_i B_L}{P_S}} \\ &= (10^{-1}/10^5)^{1/2} \\ &= 1 \text{ mRad},\end{aligned}$$

which corresponds to a UBS position uncertainty of 3.5 meters.

Yet another indication of the quality of a UBS position estimate may be obtained by ascertaining the correlation, or "agreement", among the pseudoranges associated with the selected set of beacons (step 529). For a highly correlated set of pseudoranges (ρ) there will be little variation in the time residuals (τ) associated with the beacons in the selected set. Specifically, the measure time residual ($\tau_i$) for the $i^{th}$ beacon is given by:

$$\tau_i = (\rho_i - (R_i - D_i))/c + \eta_i$$

where $R_i$ is the range estimate to the $i^{th}$ beacon computed via equation (19). By determining the variance of the set of time residuals $\tau_i$, i=1 to M, for the M beacons in the selected set, an estimate of beacon correlation is obtained. In general, the measured time residuals reflect transient effects due to, for example, multipath signal propagation rather than the contribution of white noise. For a given set of beacon measurements, the variation of $\{\tau_i\}$ reflects the transient, uncorrelated pseudorange error over the measurement interval for the given set.

Once the GPS ACCURACY routine 510 and the UBS ACCURACY routine 512 have provided quality estimates of the position data from the GPS and uncoordinated beacon receivers 128 and 124, a position determination routine 512 selects the position solution from either the uncoordinated beacon receiver 124 or the GPS receiver 128. An average of the two position solutions may also be computed by weighting each position solution in accordance with its estimated quality. Alternately, a composite position solution based on a sequence of position and signal quality estimates from the GPS and uncoordinated beacon receivers 128 and 124 could be derived using a weighted least squares algorithm.

Various other methods for combining, or selecting between, the two position solutions based upon the quality estimates provided by the software routines 510 and 512 are also within the scope of the invention.

When the equivalent uncertainty in the GPS position estimate is determined to be larger than the UBS position uncertainty based upon evaluation of the UBS and GPS signal quality information, the UBS location may be "assigned" to the GPS location for the purpose of correcting GPS pseudorange measurement. It is expected that UBS position uncertainty will potentially be less than GPS position uncertainty only when non-differentially corrected GPS systems are employed. Likewise, when the uncertainty in the GPS position estimate is deemed less than the UBS position uncertainty, UBS pseudorange measurements may be corrected via assignment of the current GPS location estimate to the UBS location. Such assignment of the GPS location to the UBS location, or vice-versa, may also be designed to occur when either the GPS or UBS position uncertainty exceeds a predetermined level.

In accordance with another aspect of the invention, the navigation processor 136 computes each UBS position estimate using a set of UBS beacon pseudorange measurements selected on the basis of an instantaneous position update provided by the GPS receiver. Specifically, after being provided each GPS position update the navigation processor 136 determines the extent to which each UBS beacon pseudorange measurement disagrees therewith. The discrepancy between the $i^{th}$ UBS beacon pseudorange and the current GPS position may be quantified in the form of a time residual, $\tau_i$, given by $$\tau_i^{GPS} = \rho_i - (R_i - D_i^{GPS}) = T_\mu + \eta_i^{GPS}$$

where $D_i^{GPS}$ is the range GPS position to the ith beacon, and $\eta_i^{GPS}$ is the time residual error conditioned on the GPS position.

For a given set of UBS beacon pseudorange measurements, the variance of their respective time residuals $\{\tau_i^{GPS}\}$ is indicative of the extent of correlation of the set with the current GPS position. A variety of techniques may be employed using this criteria to select a set of UBS beacon pseudorange estimates consistent with the current GPS position.

For example, a number of sets of three or more UBS beacon pseudorange measurements of a predefined minimal DOP may be compiled and then ranked in accordance with the variance of the time residuals $\{\tau_i^{GPS}\}$ for each set. The set of UBS beacon pseudorange measurements characterized by the least variance of time residuals could then be selected for computation of the current UBS position estimate. In order to reduce the frequency with which the selected set of UBS beacon pseudorange measurements is changed in response to new GPS position estimate, a voting scheme or the like could be employed. That is, the pseudorange measurements from each beacon could be weighted based an average of the rankings of the measurements associated with each beacon over a time period of sufficient length (e.g., 10 seconds).

Figure 17:
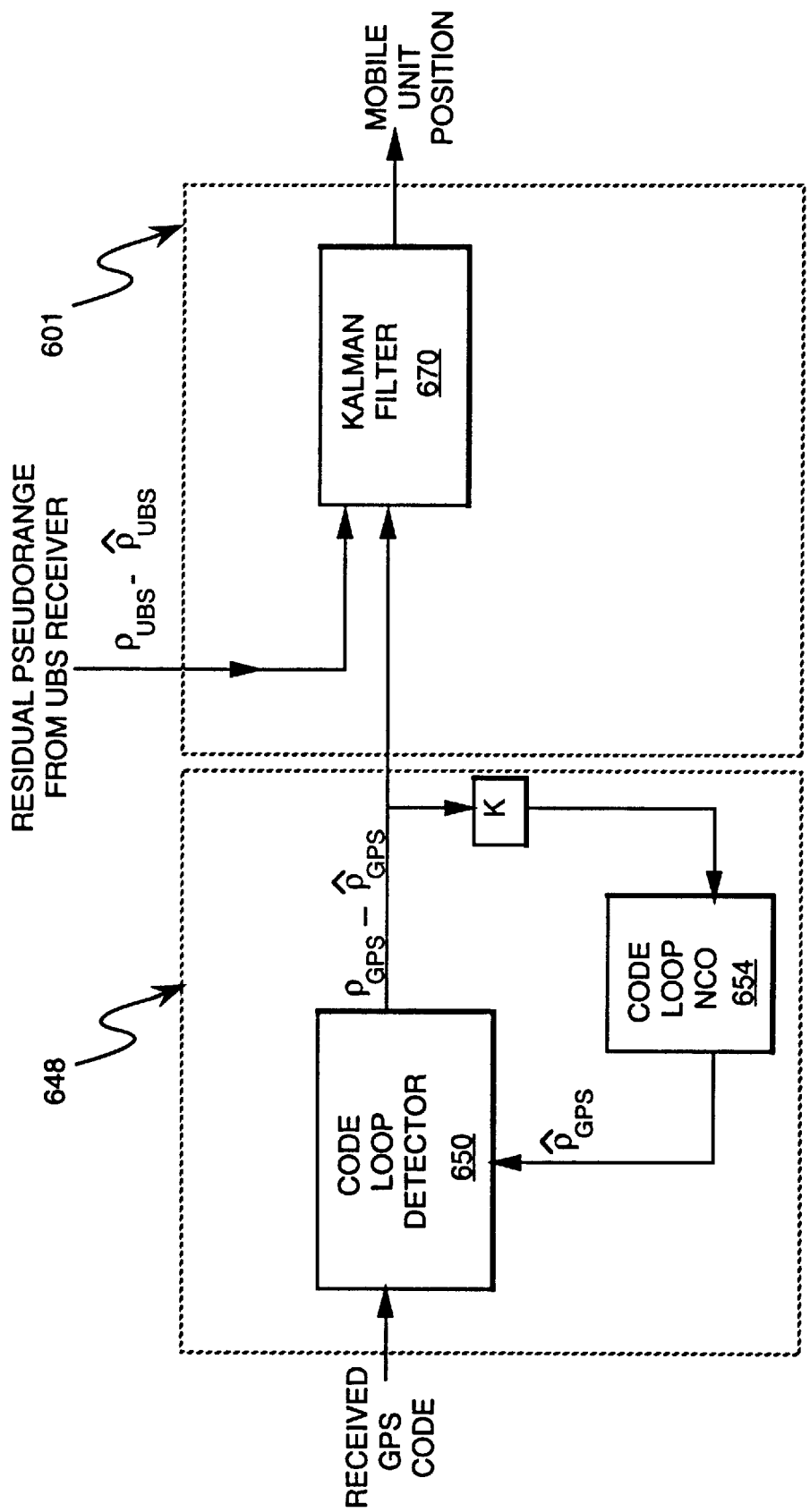
FIG. 17 depicts a particular Kalman filter implementation of a navigation estimator disposed to process residual pseudorange information from UBS and GPS receivers.
Figure 18:
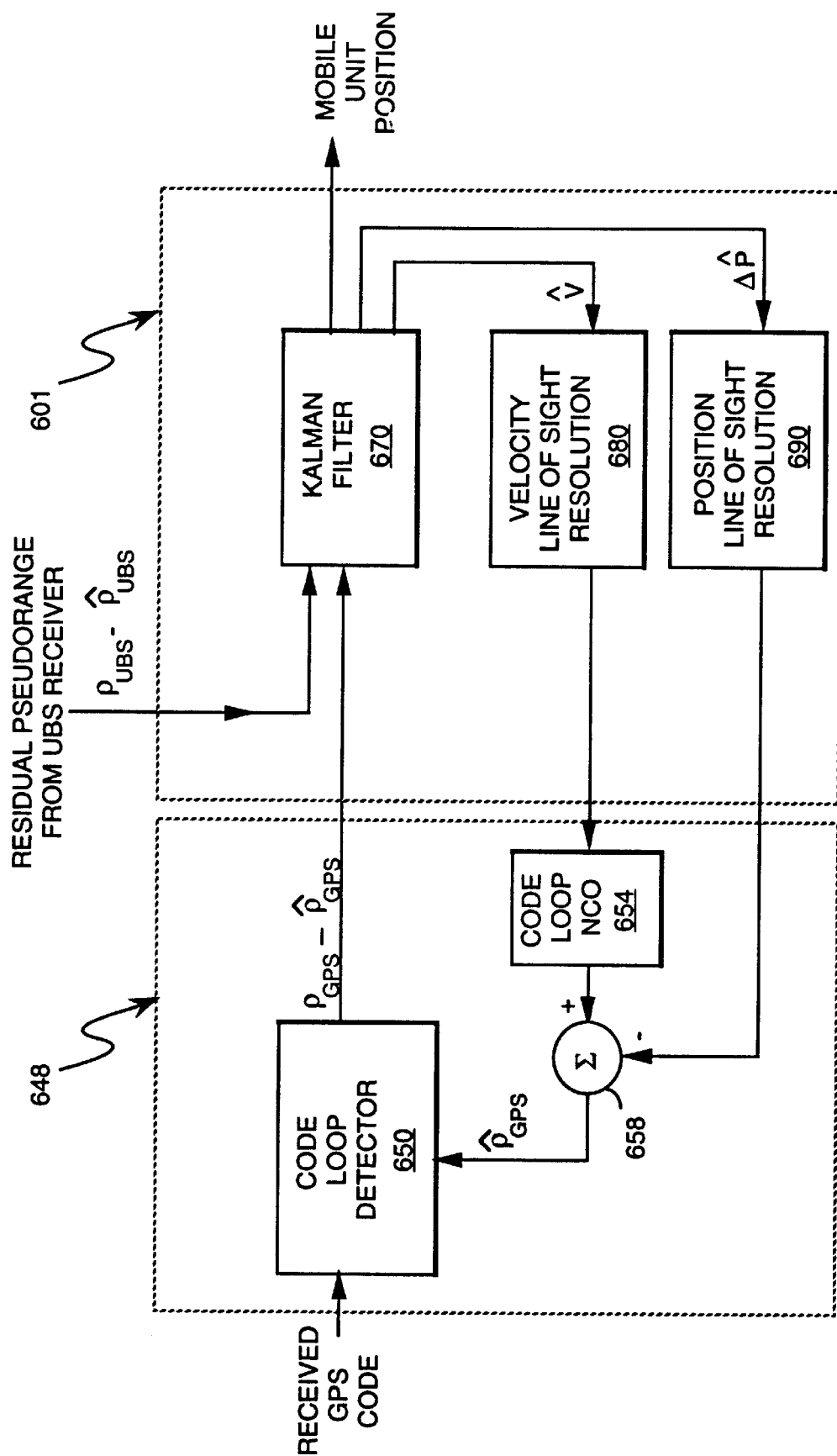
FIG. 18 depicts another Kalman filter implementation of a navigation estimator disposed to process residual pseudorange information from UBS and GPS receivers.

Turning now to FIG. 16, a block diagram is provided of a mobile unit 600 in which certain information is exchanged between the uncoordinated beacon system (UBS) and GPS receivers 602 and 604 as a means of improving position estimation accuracy. In addition, the mobile unit 600 includes an estimator 601 operative to compute an estimate of mobile unit position on the basis of selected pseudorange measurements from each receiver. In what follows, reference will be made to the general block diagram of FIG. 16 in order to describe the manner in which the UBS and GPS receivers 602 and 604 cooperate through exchange of information. In FIGS. 17 and 18, a description is provided of particular Kalman filter implementations of the estimator 601.

As was described in the preceding section entitled MAIN CONTROL ROUTINE—MOBILE UNIT, information provided by the fixed observer allows the mobile unit to predict the phase at any beacon as a function of the time defined by the fixed observer. By observing the phase from a selected set of beacons as a function of its own time, the mobile unit is able to formulate a set of simultaneous pseudorange equations allowing computation of the range to each beacon. Since the mobile unit is unaware of the bias of its own clock relative to the fixed observer's clock, these simultaneous pseudorange equations (equation 13) are a function of time as well as of position.

However, if both the mobile unit and the fixed observer are equipped with a GPS receiver of the type depicted in FIG. 16, the UBS receiver within both the fixed observer and the mobile unit could be referenced to the UTC time standard used utilized by GPS. That is, the fixed observer would provide UTC time-stamped estimates of the phase at each beacon to the mobile unit, and the mobile unit would compile UTC time-stamped measurements of beacon phase at the mobile unit's location. A set of simultaneous equations incorporating these measured phases, and beacon phase estimates, could then be formulated and solved for the range from the mobile unit to each beacon. This set of simultaneous equations would be substantially similar to those described previously (equation 13), but would not be a function of time. In this way the GPS system is used to effect time alignment between the fixed observer and mobile unit, thereby facilitating the computation of the actual range between the mobile unit and each beacon.

As is well known, each GPS satellite broadcasts a pair of unique pseudo random codes of different bit, or "chip", rates. One of the codes has been termed the Coarse-Acquisition (CIA) code, and the other is the higher-rate P code. These pseudo random timing signals are received by terrestrial GPS receivers, which measure travel time of the signals from the known satellite positions. Since the travel time and propagation speed are known, the GPS receiver can compute the distance, or "pseudorange", from itself to each satellite from which a signal is received. The term "pseudorange" refers to a distance measurement which has not been corrected for errors in synchronization (i.e, clock bias) between the local GPS receiver clock and the clock on-board the transmitting GPS satellite. By using four such pseudorange measurements, the clock bias may be eliminated and the position of the GPS receiver may be determined using straightforward computational techniques.

As is indicated by FIG. 16, the central processing unit (CPU) 614 within the GPS receiver 604 may optionally be provided with differential GPS corrections received by the UBS receiver 602. The differential GPS corrections allow the GPS CPU 614 to at least partially compensate for timing differences between the local clock of the GPS receiver 604 and UTC time, for ephemeris (orbit) errors of the GPS satellites, and for atmospheric refraction of the received satellite timing signals.

The GPS receiver 604 also includes a GPS spread spectrum correlator 618 operative to correlate locally generated replicas of the pseudo random C/A and P codes with those carried by the satellite signals. In particular, the locally generated code corresponding to a particular GPS satellite is shifted in time relative to the code carried by the signal received from the satellite until constructive addition, or "correlation" of the two code patterns occurs. The value of the time shift of the locally generated code is provided to the GPS CPU 614, which multiplies the time shift by the speed of light to obtain the pseudorange to the OPS satellite.

Referring to FIGS. 17 and 18, descriptions will now be provided of implementations of the estimator 601 as a Kalman filter responsive to residual pseudorange information from the UBS and GPS receivers 602 and 604. As employed herein, the term "residual pseudorange" refers to the difference between a measurement of pseudorange made by either the UBS or GPS receiver, and an "a priori" pseudo-range estimate regressively derived from the last position solution produced by the estimator 601. For example, each a priori GPS pseudo-range estimate corresponds to the code shift (i.e., pseudorange) associated with the distance between the last (i.e., at time $t_{i-1}$) mobile unit position estimate and the known position of a GPS satellite at time $t_{i-1}$. A GPS residual pseudorange may then be computed by determining the difference between the measured pseudorange to the satellite at time $t_i$ and the a priori GPS pseudorange estimate for time $t_{i-1}$. In both the implementations of FIGS. 17 and 18, the input to the Kalman filter used to realize the estimator 601 comprises the difference between the residual pseudoranges produced by the GPS and UBS receivers 602 and 604.

Referring to FIG. 17, a single channel 648 of the GPS receiver 604 includes a code loop detector 650 disposed to process the GPS code information received from a particular satellite. The code loop detector 650, in response to the received GPS code information, determines a current GPS pseudorange measurement $P_{GPS}$ using conventional techniques. The GPS receiver channel 648 further includes a code loop NCO 654 disposed to provide an a priori GPS pseudorange estimate $\hat{\rho}_{GPS}$ to the code loop detector 650. The output of the code loop detector 650 comprises the GPS pseudorange residual $\rho_{GPS}-\hat{\rho}_{GPS}$, which is scaled by a gain factor of K and provided as a control input to the code loop NCO 654.

In the embodiment of the FIG. 17, the estimator 601 combines the GPS pseudorange residual ($\rho_{GPS}-\hat{\rho}_{GPS}$) and a UBS pseudorange residual ($\rho_{UBS}-\hat{\rho}_{UBS}$). In a preferred implementation the UBS receiver is configured to provide a pseudorange residual corresponding to the difference between the current value of the phase shift $\phi_n(t)$ as defined by equation (2), i.e., $P_{UBS}=\phi_n(t)$, and an a priori UBS pseudorange $\phi_n(t-1)$, i.e., $\hat{\rho}_{UBS}=\phi_n(t-1)$. In the exemplary embodiment the a priori UBS pseudorange $\phi_n(t-1)$ is derived by computing the difference between the UBS position estimate {x,y,z} at time (t-1) and the known fixed observer position. As is indicated by FIG. 17, the GPS and UBS pseudorange residuals comprise the inputs to a Kalman filter 670. In response to this difference in pseudorange residuals, the Kalman filter 670 is disposed to dynamically change the current estimated mobile unit position. That is, the Kalman filter changes its "state" (i.e., mobile unit position) on the basis of change in the difference in pseudorange residuals provided thereto.

In FIG. 18, an individual channel 648' of the GPS receiver 604 again includes a code loop detector 650 disposed to produce a current GPS pseudorange measurement $P_{GPS}$ in response to code information received from the satellite being tracked. For purposes of clarity, in FIGS. 17 and 18 like reference numerals are employed to identify substantially similar processing elements. Proceeding accordingly, the GPS receiver channel 648' further includes a code loop NCO 654 for providing an initial a priori GPS pseudorange estimate, with the actual a priori GPS pseudorange estimate $\hat{\rho}_{GPS}$ being produced by a code loop summer 658. The output of the code loop detector 650 comprises the GPS pseudorange residual $\rho_{GPS} - \hat{\rho}_{GPS}$, which serves as one of the inputs to the estimator 601.

The UBS pseudorange residual ($\rho_{UBS} - \hat{\rho}_{GPS}$) comprises the second input to the Kalman filter 670. In response, the Kalman filter 670 is disposed to dynamically change the current estimated mobile unit position. The Kalman filter 670 also produces an estimate of mobile unit velocity v, which is converted to velocity along the line of sight to the GPS satellite being tracked by a velocity line of sight resolution module 680. As is indicated by FIG. 18, the output of the velocity line of sight resolution module 680 serves as a rate-aiding control input to the code loop NCO 654. Similarly, the Kalman filter 670 also computes an estimate of the change in mobile unit position Δp, which is converted to position change along the line of sight to the GPS satellite being tracked by a position line of sight resolution module 690. The output of the position line of sight resolution module 690 is provided to the code loop summer 658, which modifies the value provided by the code loop NCO 654 in response thereto in order to produce the a priori GPS pseudorange estimate $\hat{\rho}_{GPS}$.

ALTERNATE EMBODIMENTS

The beacon signals used by the present invention need not be sinusoidal waveforms. For instance, a square wave or pulsed beacon signal could be used, requiring only that the system's phase detector circuit measure the phase of transitions in the received beacon signal. Other beacon signal waveforms could be used, so long as the phase of the received beacon signal can be resolved accurately by both the fixed position observer and the mobile units.

As an example of an alternate system capable of providing beacon signal waveforms suitable for use within the present invention, a description is given of certain characteristics of the Global System for Mobile Communications (GSM) cellular telephone system. The GSM system relies upon time division multiple access (TDMA) digital signal transmission. In this regard the GSM system is one of a number of cellular systems which rely upon time division of each radio frequency carrier into multiple repetitive time slots of approximately equivalent duration. Other such systems include the Japanese Digital Cellular (JDC) system, and the pan-European personal communication network (PCN) standard known DCS-1800 (Digital Cellular System at 1800 MHz).

Throughout Europe, GSM has been allocated a specific 50 MHz of spectrum divided into transmit (890 to 915 MHz) and receive (935 to 960 MHz). Each radio channel is 200 kHz wide, and thus there are a total of 125 paired channels available. Each TDMA "frame" within the GSM is of a period of 4.62 ms, and each of the eight time slots therein repeats every 0.58 ms. During each time slot, a unique 26-bit training sequence is transmitted from each GSM base station to allow bit synchronization within any nearby mobile receivers. In accordance with the invention, the training sequence or other predefined sequence may be considered as comprising a beacon signal, where the degree of completion of a given cycle of the training sequence corresponds to the beacon signal phase. By recovering and determining the time of arrival of the training sequences transmitted by a plurality of GSM base stations, position determination may be effected within the mobile unit in the same way as was previously described for the case of 19 kHz FM pilot signal.

Although the period between transmission of the training cycle during the same time slot in successive TDMA frames is relatively constant, successive time slots may be characterized for present purposes as being at least partially unsynchronized. That is, the degree of timing control (i.e., synchronization) within the GSM system is predicated on communication requirements (e.g., bit overlap at receiver stations) rather than upon considerations of propagation time and the like pertinent to navigation systems. It is of course understood that the discussion herein relating to recovery of training sequences within the GSM system is merely exemplary, and that other repetitive waveforms produced within the GSM and other systems may also be used within alternate embodiments of the invention.

In an alternate embodiment, the fixed observer unit is programmed to transmit not only phase values for each beacon signal, but also values of drift frequency and change in drift frequency. The latter two values are then used by the mobile unit in its computations, in place of the drift frequency and drift frequency change measured by the mobile unit, so as to eliminate any errors in time bias measurements arising from Doppler shift effects.

It is noted that while the preferred embodiment uses transmitters that are at fixed positions, the present invention could be used with mobile or orbiting transmitters, so long as the positions of the transmitters can be precisely determined at any specified point in time. Even when fixed transmitters are used, it may be convenient to provide means for discerning the fixed locations during system operation instead of manually storing the fixed locations within the mobile unit. For example, upon being deployed in a given area the mobile unit may receive, via radio communication, the locations of all beacon signal transmitters within its vicinity.

The present invention could be used with any stable radio station sub-carrier signal, preferably having a frequency between 1 KHz and 100 KHz.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A positioning system for determining location of a mobile unit, said system making use of a multiplicity of transmitters, at known locations, each of which transmits a beacon signal having a phase that is at least partially un-synchronized with the phases of the beacon signals of the other transmitters, each of said beacon signals being of a predetermined repetition rate, said system comprising:

an uncoordinated beacon positioning subsystem (UBS), said subsystem including a UBS receiver for receiving said beacon signals and for providing a UBS location of said mobile unit;

an absolute positioning subsystem (APS) including an APS receiver for receiving APS signals and for providing an APS location of said mobile unit; and a processor for determining uncertainty of location information provided by said beacon signal receiver and said APS receiver, and updating a current location of said mobile unit based on said UBS and APS locations and said uncertainty of said location information;

wherein the processor determines the uncertainty of location information for the APS receiver by measuring and evaluating at least one signal parameter associated with the APS signals, and determines the uncertainty of location information for the UBS receiver by measuring and evaluating at least one signal parameter associated with the received beacon signals.

2. The positioning system of claim 1, wherein said APS receiver comprises a global positioning system (GPS) receiver for receiving GPS signals, said processor including software for computing an indication of quality of location information provided by said GPS receiver.

3. The positioning system of claim 1, wherein said UBS receiver includes logic for computing an indication of quality of said UBS location.

4. The positioning system of claim 1, wherein said processor includes software for assigning said APS location to said UBS location when uncertainty of location information provided by said APS receiver is determined to be less than uncertainty of location information provided by said UBS receiver.

5. The positioning system of claim 1, wherein said processor includes software for assigning said APS location to said UBS location when uncertainty of location information provided by said UBS receiver is determined to exceed a predetermined level.

6. The positioning system of claim 1, wherein said UBS receiver includes a beacon signal receiver for receiving at least two of said beacon signals, said beacon signal receiver including phase detection circuitry for detecting the phases of at least three of said beacon signals at the location of said mobile unit, and processor for computing said UBS location based on said detected phases and on an initial location estimate provided by said APS receiver.

7. The positioning system of claim 1, wherein said processor includes software for assigning said UBS location to said APS location when uncertainty of location information provided by said APS receiver is determined to exceed a predetermined level.

8. The positioning system of claim 1, wherein said UBS receiver also receives local traffic information from one of said multiplicity of transmitters, said local traffic information being useable for navigation.

9. The positioning system of claim 1, wherein the processor, when the determined uncertainty of the UBS location is less than the determined uncertainty of the APS location, updates the current position in a manner selected from the set consisting of (A) based solely on the UBS location, and (B) based on a weighted combination of the UBS and APS locations wherein the UBS location is weighted more heavily than the APS location.

10. A positioning system for determining position of a mobile unit, comprising:

a multiplicity of transmitters, at known locations, each of which transmits a beacon signal having a phase that is at least partially un-synchronized with the phases of the beacon signals of the other transmitters; each of said beacon signals having a frequency which is approximately equal to a predetermined target frequency;

a first receiver, at a known location relative to the locations of said multiplicity of transmitters, which (A) receives said beacon signals, (B) determines the relative phases of said beacon signals, and (C) broadcasts phase data representing said relative phases;

a second receiver, disposed within said mobile unit, which receives said broadcast phase data from said first receiver and at least three of said beacon signals, said second receiver including phase detection circuitry for detecting the phases of said beacon signals at the location of said mobile unit, and data processing circuitry for computing a first estimated location of said mobile unit based on said broadcast values and said detected phases;

an absolute positioning system (APS) receiver, disposed within said mobile unit, for receiving APS signals and for providing a second estimated location of said mobile unit; and a processor for evaluating positional uncertainty in said first and second estimated locations, and for updating a current position of said mobile unit based on said first and second estimated locations of said mobile unit and said positional uncertainty;

wherein the processor determines the uncertainty of the first estimated location by measuring and evaluating at least one signal parameter associated with the beacon signals, and determines the uncertainty of the second estimated location by measuring and evaluating at least one signal parameter associated with the received APS signals.

11. The positioning system of claim 10, wherein the processor, when the determined uncertainty of the first estimated location is less than the determined uncertainty of the second estimated location, updates the current position in a manner selected from the set consisting of (A) based solely on the first estimated location, and (B) based on a weighted combination of the first and second estimated locations wherein the first estimated location is weighted more heavily than the second estimated location.

12. A positioning system, comprising:

a multiplicity of transmitters, at known locations, each of which transmits a beacon signal having a phase that is at least partially un-synchronized with the phases of the beacon signals of the other transmitters; each of said beacon signals having a frequency which is approximately equal to a predetermined target frequency; and a mobile unit including:

a beacon signal receiver for receiving at least three of said beacon signals, said beacon signal receiver including phase detection circuitry for detecting the phases of the at least three of said beacon signals received thereby, an absolute positioning system (APS) receiver for receiving APS signals and for estimating an initial position of said mobile unit therefrom, and a processor for computing a current location of said mobile unit based on:

(i) said detected phases of the at least three of said beacon signals, and (ii) said estimate of said initial position;

said processor including:

a memory for storing estimates of location of said mobile unit made by said APS receiver at first and second calibration times, and for storing phases and frequencies of said beacon signals received from a plurality of said transmitters at said first and second calibration times, and software for determining phase and frequency drift of said beacon signals based on said stored estimates of location of said mobile unit and said stored phases and frequencies of said beacon signals.

13. The positioning system of claim 12, wherein said APS receiver comprises a global positioning system (GPS) receiver and wherein said processor includes:

a memory for storing GPS time indications extracted from GPS signals received by said GPS receiver at first and second calibration times, and for storing local time indications registered by a local clock within said mobile unit at said first and second calibration times, and software for calibrating said local clock by comparing a difference between said local time indications to a difference between said GPS time indications.

14. The positioning system of claim 12, wherein said processor includes:

a memory for storing APS time indications extracted from said APS signals received by said APS receiver at first and second calibration times, and for storing local time indications registered by a local clock within said mobile unit at said first and second calibration times, and software for calibrating said local clock by comparing difference between said local time indications to difference between said APS time indications.

15. The positioning system of claim 12, said beacon signal receiver including circuitry for acquiring position data specifying the positions of said multiplicity of transmitters;

said processor including software for performing a predefined position computation using said position data to generate a position value for said mobile unit which is consistent with said position data.

16. The positioning system of claim 12, wherein said beacon signal transmitted by each of said transmitters comprise FM radio station pilot signals having frequencies of approximately 19 kHz.

17. The positioning system of claim 12, wherein said APS receiver comprises a receiver selected from the set consisting of: a global positioning system (GPS) receiver and a LORAN receiver.

18. The positioning system of claim 12, wherein said APS receiver comprises a receiver selected from the set consisting of: an OMEGA receiver and a TRANSIT receiver.

19. The positioning system of claim 12, wherein said beacon signal receiver also receives local traffic information from one of said multiplicity of transmitters, said local traffic information being useable for navigation.

20. In a positioning system which makes use of:

(i) an uncoordinated beacon positioning subsystem (UBS), said subsystem including a multiplicity of transmitters, at known fixed locations, each of which transmits a beacon signal having a phase that is at least partially un-synchronized with the phases of the beacon signals of the other transmitters, each of said beacon signals having a frequency which is approximately equal to a predetermined target frequency, and (ii) global positioning system (GPS) signals transmitted by a multiplicity of GPS satellites, a method for determining location of a mobile unit, said method comprising the steps of:

receiving a plurality of said beacon signals and determining a UBS location of said mobile unit therefrom;

receiving a plurality of said GPS signals and determining a GPS location of said mobile unit therefrom; and determining uncertainty of said GPS and UBS locations, and updating a current location of said mobile unit based on said UBS and GPS locations and said uncertainty thereof;

wherein the determining step includes determining the uncertainty of GPS location by measuring and evaluating at least one signal parameter associated with the GPS signals, and determining the uncertainty of UBS location by measuring and evaluating at least one signal parameter associated with the received beacon signals.

21. The method of claim 20 wherein said step of determining uncertainty includes the step of computing a dilution of precision associated with said plurality of received GPS signals.

22. The method of claim 21 wherein said step of determining uncertainty includes the step of computing a UBS dilution of precision associated with said plurality of beacon signals.

23. The method of claim 20 further including the step of assigning said APS location to said UBS location when uncertainty of said APS location is determined to be less than uncertainty of said UBS location.

24. The method of claim 23 further including the step of assigning said UBS location to said APS location when uncertainty of said UBS location is determined to be less than uncertainty of said APS location.

25. The method of claim 20 wherein said step of determining a UBS location includes the steps of:

receiving at least three of said beacon signals, detecting the phases of at least three of said beacon signals at the location of said mobile unit, and computing a change in UBS location based upon said detected phases.

26. The method of claim 20, further including receiving local traffic information from one of said multiplicity of transmitters, said local traffic information being useable for navigation.

27. The method of claim 20, wherein the determining step includes, when the determined uncertainty of the UBS location is less than the determined uncertainty of the APS location, updating the current position in a manner selected from the set consisting of (A) based solely on the UBS location, and (B) based on a weighted combination of the UBS and APS locations wherein the UBS location is weighted more heavily than the APS location.

28. In a positioning system which makes use of an uncoordinated beacon positioning subsystem and an absolute positioning subsystem (APS), said uncoordinated beacon positioning subsystem including a multiplicity of transmitters, at known fixed locations, each of which transmits a beacon signal having a phase that is at least partially un-synchronized with the phases of the beacon signals of the other transmitters, each of said beacon signals having a frequency which is approximately equal to a predetermined target frequency, a method for determining location of a mobile unit comprising the steps of:

at a known location relative to the locations of said multiplicity of transmitters, receiving said beacon signals, determining the relative phases of said beacon signals, and broadcasting phase data representing said relative phases;

at said mobile unit, receiving said broadcast phase data and receiving at least three of said beacon signals, detecting the phases of said beacon signals received at said mobile unit, and computing a first estimated location of said mobile unit based on said broadcast values and said detected phases;

at said mobile unit, receiving APS signals generated at known locations within a coordinated system of said APS subsystem, and providing a second estimated location of said mobile unit using said received APS signals; and evaluating positional uncertainty in said first and second estimated locations, and updating a current position of said mobile unit based on said first and second estimated locations of said mobile unit and said positional uncertainty;

wherein the evaluating step includes determining the uncertainty of the first estimated location by measuring and evaluating at least one signal parameter associated with the beacon signals, and determining the uncertainty of the second estimated location by measuring and evaluating at least one signal parameter associated with the received APS signals.

29. The method of claim 28, further including receiving local traffic information from one of said multiplicity of transmitters, said local traffic information being useable for navigation.

30. The method of claim 28, wherein the determining step includes, when the determined uncertainty of the first estimated location is less than the determined uncertainty of the second estimated location, updating the current position in a manner selected from the set consisting of (A) based solely on the first estimated location, and (B) based on a weighted combination of the first and second estimated locations wherein the first estimated location is weighted more heavily than the second estimated location.

31. A method of determining a mobile unit's current location with respect to the positions of a multiplicity of transmitters that are positioned at known locations, wherein each transmitter transmits a beacon signal having a phase that is at least partially un-synchronized with the phases of the beacon signals of the other transmitters, each of said beacon signals having a frequency which is approximately equal to a predetermined target frequency, the steps of the method comprising:
  receiving, at said mobile unit, at least three of said beacon signals, and detecting the phases of the at least three of said beacon signals received at said mobile unit;
  receiving, at said mobile unit, signals provided by an absolute positioning system (APS), and estimating an initial position of said mobile unit using said APS signals received at said mobile unit; and
  computing said current location of said mobile unit based on: (i) said detected phases of the at least three of said beacon signals, and (ii) said estimate of said initial position;
  said step of computing includes the steps of:
    estimating location of said mobile unit based on APS signals received at said mobile unit at first and second calibration times, and storing phases and frequencies of ones of said beacon signals received from a plurality of said transmitters at said first and second calibration times, and determining phase and frequency drift and drift rates of said beacon signals based on said stored estimates of location of said mobile unit and said stored phases and frequencies of said beacon signals.

32. The method of claim 31 wherein said absolute positioning system comprises the global positioning system (GPS), and wherein said step of computing includes the steps of:
  storing GPS time indications extracted from GPS signals received at said mobile unit at first and second calibration times, and storing local time indications registered by a local clock within said mobile unit at said first and second calibration times, and
  calibrating said local clock by comparing difference between said local time indications to difference between said GPS time indications.

33. The method of claim 31 further including the step of receiving, at said mobile unit, local traffic information useable for navigation.

34. In a positioning system which makes use of:
  (A) an uncoordinated beacon positioning subsystem, said uncoordinated beacon positioning subsystem including a multiplicity of transmitters, at known fixed locations, each of which transmits a beacon signal having a phase that is at least partially un-synchronized with the phases of the beacon signals of the other transmitters, each of said beacon signals having a frequency which is approximately equal to a predetermined target frequency, and
  (B) a multiplicity of global positioning system (GPS) satellites, each of which transmits a GPS signal having a predefined phase relationship to the GPS signals transmitted by the other satellites, wherein each of said GPS signals includes information indicative of a position of the GPS satellite within a GPS coordinate system at the time of transmission of the GPS signal therefrom;
  a method for determining location of a mobile unit comprising the steps of:
    at said mobile unit,
    (i) receiving at least three of said beacon signals and computing a first set of estimated ranges between a current position of said mobile unit within said predefined coordinate system and the three of said beacon signal transmitters from which were transmitted said at least three of said beacon signals;
    (ii) receiving a plurality of said GPS signals and computing a second set of estimated ranges between a current position of said mobile unit within said GPS coordinate system and said GPS satellites from which were transmitted said plurality of GPS signals;
    (iii) forming a set of simultaneous position equations based on said first and second sets of estimated ranges, said set of simultaneous position equations being referenced to said GPS coordinate system; and
    (iv) solving said set of simultaneous equations in order to determine said current location of said mobile unit.

35. The method of claim 34 wherein said forming step includes forming said set of simultaneous position equations using four range estimates included within said first and second sets of estimated ranges, said set of simultaneous position equations being referenced to said GPS coordinate system and to a GPS time system.

36. A positioning system for determining location of a mobile unit, said system making use of a multiplicity of transmitters, at known locations, each of which transmits a beacon signal having a phase that is at least partially un-synchronized with the phases of the beacon signals of the other transmitters, each of said beacon signals being of a predetermined repetition rate, said system comprising:

an uncoordinated beacon positioning subsystem (UBS), said subsystem including a UBS receiver for receiving said beacon signals and for generating a UBS pseudorange residual signal;

an absolute positioning subsystem (APS) including an APS receiver for receiving APS signals and for generating an APS pseudorange residual signal, said APS receiving including a code loop detector that generates said APS pseudorange residual signal and a code loop oscillator in a feedback arrangement with said code loop detector; and an estimator for filtering and combining said UBS pseudorange residual signal and said ABS pseudorange residual signal to generate a velocity signal used to control said code loop oscillator in said APS and to generate a change-in-position signal;

said feedback arrangement in said APS including apparatus for combining said change-in-position signal with a signal generated by said code loop oscillator to generate an a priori APS pseudorange signal that is feed back to said code loop detector.

* * * * *